United States Patent
Tsutsui et al.

[11] Patent Number: 6,167,093
[45] Date of Patent: *Dec. 26, 2000

[54] METHOD AND APPARATUS FOR ENCODING THE INFORMATION, METHOD AND APPARATUS FOR DECODING THE INFORMATION AND METHOD FOR INFORMATION TRANSMISSION

[75] Inventors: Kyoya Tsutsui; Osamu Shimoyoshi, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/514,393

[22] Filed: Aug. 11, 1995

[30] Foreign Application Priority Data

Aug. 16, 1994 [JP] Japan .................................. 06-192442

[51] Int. Cl.$^7$ ................................................... H03M 7/30
[52] U.S. Cl. ......................... 375/242; 375/241; 370/210; 704/204; 364/725.03
[58] Field of Search .................................. 375/241–246, 375/253; 370/207, 210; 341/143; 395/2, 2.13, 2.21, 2.38, 2.39; 704/203, 204, 212; 364/725.03, 726.01, 726.02, 726.03

[56] References Cited

U.S. PATENT DOCUMENTS

| | | | |
|---|---|---|---|
| 5,109,417 | 4/1992 | Fielder et al. ........................ | 395/2.14 |
| 5,117,228 | 5/1992 | Fuchigami et al. .................... | 341/200 |
| 5,142,656 | 8/1992 | Fielder et al. ........................ | 395/2.38 |
| 5,218,561 | 6/1993 | Iwadare ................................ | 364/725 |
| 5,222,189 | 6/1993 | Fielder ................................. | 395/2.38 |
| 5,230,038 | 7/1993 | Fielder et al. ........................ | 395/2.38 |
| 5,241,603 | 8/1993 | Akagiri et al. ....................... | 381/37 |
| 5,285,476 | 2/1994 | Akagiri et al. ....................... | 375/25 |
| 5,301,205 | 4/1994 | Tsutsui et al. ........................ | 375/1 |
| 5,349,549 | 9/1994 | Tsutsui ................................. | 364/725 |
| 5,357,594 | 10/1994 | Fielder ................................ | 395/2.2 |
| 5,375,189 | 12/1994 | Tsutsui ................................. | 395/2.38 |
| 5,381,143 | 1/1995 | Shimoyoshi et al. ................. | 341/124 |
| 5,392,231 | 2/1995 | Takahashi ............................. | 364/725 |
| 5,394,473 | 2/1995 | Davidson .............................. | 395/2.2 |
| 5,438,643 | 8/1995 | Akagiri et al. ....................... | 395/2.1 |
| 5,454,011 | 9/1995 | Shimoyoshi et al. ................. | 375/240 |
| 5,461,378 | 10/1995 | Shimoyoshi et al. ................ | 341/51 |
| 5,473,727 | 12/1995 | Nishiguchi et al. .................. | 395/2.31 |
| 5,548,574 | 8/1996 | Shimoyoshi et al. ................. | 369/59 |
| 5,581,654 | 12/1996 | Tsutsui ................................. | 395/2.39 |
| 5,590,108 | 12/1996 | Mitsuno et al. ...................... | 369/59 |
| 5,619,570 | 4/1997 | Tsutsui ................................. | 380/4 |
| 5,623,557 | 4/1997 | Shimoyoshi et al. ................. | 382/246 |
| 5,634,082 | 5/1997 | Shimoyoshi et al. ................. | 395/2.38 |
| 5,640,421 | 6/1997 | Sonohara et al. .................... | 375/240 |
| 5,646,960 | 7/1997 | Sonohara et al. .................... | 375/340 |
| 5,680,130 | 10/1997 | Tsutsui et al. ....................... | 341/87 |
| 5,717,821 | 2/1998 | Tsutui et al. ......................... | 395/2.14 |
| 5,724,612 | 3/1998 | Haneda et al. ....................... | 395/853 |
| 5,731,767 | 3/1998 | Tsutsui et al. ....................... | 341/50 |
| 5,737,718 | 4/1998 | Tsutsui ................................. | 704/205 |
| 5,752,224 | 5/1998 | Tsutsui et al. ....................... | 704/225 |
| 5,754,127 | 5/1998 | Tsutsui et al. ....................... | 341/54 |

(List continued on next page.)

*Primary Examiner*—Young T. Tse
*Attorney, Agent, or Firm*—Limbach & Limbach L.L.P.; Seong-Kun Oh

[57] ABSTRACT

A method and apparatus for encoding input digital data by high-efficiency encoding, a method for transmitting the encoded information and a method and apparatus for reproducing and decoding the transmitted information, are disclosed. For encoding, an input signal is forward orthogonal transformed into spectral signals using a windowing function for forward orthogonal transform having a shape A. For decoding, the spectral signals are inverse orthogonal transformed using a windowing function having a shape B different from the shape A. The degree of concentration of the energy of the spectral distribution may be raised and efficient encoding may be achieved even in case of modified DCT (MDCT) wherein the windowing function needs to satisfy a pre-set constraint.

335 Claims, 12 Drawing Sheets

U.S. PATENT DOCUMENTS

| | | | |
|---|---|---|---|
| 5,754,501 | 5/1998 | Tsutsui | 369/32 |
| 5,758,020 | 5/1998 | Tsutsui | 395/213 |
| 5,758,316 | 5/1998 | Oikawa et al. | 704/230 |
| 5,761,642 | 6/1998 | Suzuki et al. | 704/503 |
| 5,765,126 | 6/1998 | Tsutsui et al. | 704/206 |
| 5,778,339 | 7/1998 | Sonohara et al. | 704/224 |
| 5,781,586 | 7/1998 | Tsutsui | 375/241 |
| 5,796,695 | 8/1998 | Tsutsui | 369/60 |
| 5,805,770 | 9/1998 | Tsutsui | 395/2.33 |
| 5,819,214 | 10/1998 | Suzuki et al. | 704/229 |
| 5,825,310 | 10/1998 | Tsutsui | 341/51 |
| 5,825,979 | 10/1998 | Tsutsui et al. | 395/2.91 |
| 5,832,424 | 11/1998 | Tsutsui | 704/206 |
| 5,832,426 | 11/1998 | Tsutsui et al. | 704/229 |
| 5,835,030 | 11/1998 | Tsutsui | 341/51 |
| 5,835,593 | 11/1998 | Tsutsui | 380/23 |
| 5,870,703 | 2/1999 | Oikawa et al. | 704/206 |
| 5,901,234 | 5/1999 | Sonohara et al. | 381/104 |
| 5,925,112 | 7/1999 | Haneda et al. | 710/33 |
| 5,930,750 | 7/1999 | Tsutsui | 704/229 |
| 5,974,379 | 10/1999 | Hatanaka et al. | 704/225 |
| 5,983,175 | 11/1999 | Shimoyoshi et al. | 704/230 |

METHOD AND APPARATUS FOR ENCODING THE INFORMATION, METHOD AND APPARATUS FOR DECODING THE INFORMATION AND METHOD FOR INFORMATION TRANSMISSION

BACKGROUND OF THE INVENTION

This invention relates to a method and apparatus for encoding input digital data by high-efficiency encoding, a method for transmitting the encoded information and a method and apparatus for reproducing and decoding the transmitted information.

There exist a variety of high efficiency encoding techniques of encoding audio or speech signals. Examples of these techniques include transform coding in which a frame of digital signals representing the audio signal on the time axis is converted by an orthogonal transform into a block of spectral coefficients representing the audio signal on the frequency axis, and a sub-band coding in which the frequency band of the audio signal is divided by a filter bank into a plurality of sub-bands without forming the signal into frames along the time axis prior to coding. There is also known a combination of sub-band coding and transform coding, in which digital signals representing the audio signal are divided into a plurality of frequency ranges by sub-band coding, and transform coding is applied to each of the frequency ranges.

Among the filters for dividing a frequency spectrum into a plurality of equal-width frequency ranges include the quadrature mirror filter (QMF) as discussed in R. E. Crochiere, Digital Coding of Speech in Sub-bands, 55 Bell Syst. Tech J. No. 8 (1976). With such QMF filter, the frequency spectrum of the signal is divided into two equal-width bands. With the QMF, aliasing is not produced when the frequency bands resulting from the division are subsequently combined together.

In "Polyphase Quadrature Filters—A New Subband Coding Technique", Joseph H. Rothweiler, ICASSP 83, Boston, there is shown a technique of dividing the frequency spectrum of the signal into equal-width frequency bands. With the present polyphase QMF, the frequency spectrum of the signals can be divided at a time into plural equal-width frequency bands.

There is also known a technique of orthogonal transform including dividing the digital input audio signal into frames of a predetermined time duration, and processing the resulting frames using a discrete Fourier transform (DFT), discrete cosine transform (DCT) and modified DCT (MDCT) for converting the signal from the time axis to the frequency axis. Discussions on MDCT may be found in J. P. Princen and A. B. Bradley, Subband Transform Coding Using Filter Bank Based on Time Domain Aliasing Cancellation", ICASSP 1987.

By quantizing the signals divided on the band basis by the filter or orthogonal transform, it becomes possible to control the band subjected to quantization noise and psychoacoustically more efficient coding may be achieved by utilizing the so-called masking effects. If the signal components are normalized from band to band with the maximum value of the absolute values of the signal components, it becomes possible to effect more efficient coding.

In a technique of quantizing the spectral coefficients resulting from an orthogonal transform, it is known to use sub bands that take advantage of the psychoacoustic characteristics of the human auditory system. That is, spectral coefficients representing an audio signal on the frequency axis may be divided into a plurality of critical frequency bands. The width of the critical bands increase with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from MDCT, the spectral coefficient data generated by the MDCT within each of the critical bands is quantized using an adaptively allocated number of bits. There are presently known the following two bit allocation techniques.

For example, in IEEE Transactions of Acoustics, Speech and Signal Processing, vol. ASSP-25, No. 4, August 1977, bit allocation is carried out on the basis of the amplitude of the signal in each critical band. This technique produces a flat quantization noise spectrum and minimizes the noise energy, but the noise level perceived by the listener is not optimum because the technique does not effectively exploit the psychoacoustic masking effect.

In the bit allocation technique described in M. A. Krassner, The Critical Band Encoder—Digital Encoding of the Perceptual Requirements of the Auditory System, ICASSP 1980, the psychoacoustic masking mechanism is used to determine a fixed bit allocation that produces the necessary signal-to-noise ratio for each critical band. However, if the signal-to-noise ratio of such a system is measured using a strongly tonal signal, for example, a 1 kHz sine wave, non-optimum results are obtained because of the fixed allocation of bits among the critical bands.

For overcoming these inconveniences, a high efficiency encoding apparatus has been proposed in which the total number of bits available for bit allocation is divided between a fixed bit allocation pattern pre-set for each small block and a block-based signal magnitude dependent bit allocation, and the division ratio is set in dependence upon a signal which is relevant to the input signal such that the smoother the signal spectrum, the higher becomes the division ratio for the fixed bit allocation pattern.

With this technique, if the energy is concentrated in a particular spectral component, as in the case of a sine wave input, a larger number of bits are allocated to the block containing the spectral component, for significantly improving the signal-to-noise characteristics in their entirety. Since the human auditory system is highly sensitive to a signal having acute spectral components, such technique may be employed for improving the signal-to-noise ratio for improving not only measured values but also the quality of the sound as perceived by the ear.

In addition to the above techniques, a variety of other techniques have been proposed, and the model simulating the human auditory system has been refined, such that, if the encoding device is improved in its ability, encoding may be made with higher efficiency in light of the human auditory system.

In an international application PCT/JP94/00880, filed on May 31, 1994 in the name of the present Assignee, there is disclosed a method whereby tonal components, which are most crucial to the hearing sense, are separated from spectral signals, and encoded in distinction from the remaining spectral components. This enables efficient encoding at a high compression ratio without substantially producing acoustic deterioration of audio signals.

If the above-mentioned DFT or DCT is utilized for transforming waveform signals into spectral signals, transform with time blocks consisting of M samples gives M independent real-number data. For diminishing connection distortion between neighboring time blocks, a given time block is usually overlapped by M1 samples with both neighboring time blocks. Thus, with DFT or DCT, M real-number data on an average are quantized and encoded for (M-M1) samples.

If the above-mentioned MDCT is employed for transform into spectral signals, since M samples are overlapped with both neighboring time blocks, independent M real-number data are obtained from 2M samples. Thus, on an average, 2M real-number data are quantized and encoded with MDCT for M samples. The decoder adds waveform signals, obtained on inverse transform in the respective blocks from the codes resulting from MDCT, with overlap between neighboring waveform elements, for reconstructing waveform signals.

In general, if the time block for transform is elongated, the frequency resolution of the spectrum is increased, such that the energy concentration occurs in specified spectral components. Therefore, if MDCT, in which transform is executed with a longer block length with one-half overlap with both neighboring blocks and the number of resulting spectral components is not increased with the number of original time samples, is used, the encoding may be achieved with an efficiency higher than if DFT or DCT is employed. In addition, by providing sufficiently long overlap with neighboring blocks, it becomes possible to reduce the block-to-block distortion of the waveform signals.

However, in the case of the transform in which waveform signals are constructed with overlap with both neighboring waveform elements at the time of inverse transform, such as MDCT, certain conditions need to be met by orthogonal transform and inverse orthogonal transform. If these conditions are not met, correct time-domain signals cannot be produced on inverse transform of spectral signals.

In addition to the above-mentioned constraint, the forward transform window function and the inverse transform window functions have hitherto been designed so as to have the same shape. Consequently, the window function for forward orthogonal transform which is not sufficiently smooth in shape has been used, so that the spectral signals obtained on orthogonal transform are lower in concentration in energy distribution. The result is that a large number of spectral components need to be encoded with high precision, while it is difficult to achieve efficient encoding. In particular, if tonal components are separated for encoding, it is desirable that the number of the spectral components which should be separated for constituting tonal components be as small as possible for achieving efficient encoding. However, since a sufficient frequency separation cannot be achieved with the conventional window function for forward transform, the number of spectral components that make up the respective tonal components is increased and hence efficient encoding cannot be achieved.

SUMMARY OF THE INVENTION

It is therefore an object of the present invention to provide a method and apparatus for achieving efficient encoding in case of employing transform in which waveform elements of a given block are overlapped with those of neighboring blocks for constructing waveform signals.

It is another object of the present invention to provide a corresponding method and apparatus for decoding the information and a corresponding method for transmitting the information.

In one aspect, the present invention provides an information encoding method and apparatus for encoding the information including the steps of forward orthogonal transforming an input signal using a windowing function for forward orthogonal transform so that, on inverse orthogonal transform, waveform elements are overlapped between neighboring blocks for forming waveform signals, and encoding output spectral signals produced by the forward orthogonal transform. The shape of the windowing function for forward orthogonal transform employed in the forward orthogonal transform is different from that of a transform window for inverse orthogonal transform employed for inverse orthogonal transform. The input signal may for example be acoustic signals.

In another aspect, the present invention provides an information decoding method for decoding the information including the steps of decoding encoded spectral signals, and inverse orthogonal transforming the decoded spectral signals so that waveform elements will be overlapped with each other between neighboring blocks. The windowing function for inverse orthogonal transform employed in the inverse orthogonal transform is different from that of the window function for forward orthogonal transform employed for forward orthogonal transform for producing the spectral signals. The output signal may for example be acoustic signals.

In still another aspect, the present invention provides an information transmission method including forward orthogonal transforming an input signal using a windowing function for forward orthogonal transform for forming spectral signals, encoding the spectral signals, decoding the encoded spectral signals and inverse orthogonal transforming the decoded spectral signals using a windowing function for inverse orthogonal transform different from the windowing function for forward orthogonal transform so that waveform elements will conflict with each other between neighboring blocks.

With the information encoding method and apparatus, information decoding method and apparatus and the information transmission method of the present invention, the maximum value of the inverse transform windowing function does not exceed a value equal to twice a median value of the windowing function for inverse orthogonal transform.

The shape of a transient portion of the windowing function for forward orthogonal transform is obtained by dividing a window obtained by the equation (21) which will be given later and into two by subsequent shifting. In this equation, $w_1(n)$ is the windowing function for forward orthogonal transform, q is a value close to 1 and M the number of output spectral components. The forward orthogonal transform is modified discrete cosine transform, while the windowing function for forward orthogonal transform is symmetrical or non-symmetrical. The windowing function for forward orthogonal transform has a domain having a zero value or the value of the entire domain of the windowing function is zero. The processing for encoding output spectral signals after forward orthogonal transform is variable length encoding and includes the processing of extracting and separating particular frequency components and encoding the separated frequency components.

According to the present invention, in case of using the transform in which waveform elements are conflicted with both neighboring waveform elements during inverse transform for constituting waveform signals, the windowing function for forward orthogonal transform is different in shape from that for inverse orthogonal transform, while the constraint which should be met by the transform window is met, such that the windowing function for forward orthogonal transform is smooth in shape.

That is, with the information encoding method and apparatus, information decoding method and apparatus and the information transmission method of the present invention, the degree of energy concentration in the distribution of spectral components may be raised even in cases wherein the windowing function needs to satisfy certain constraint, as in MDCT, thus enabling efficient encoding.

DESCRIPTION OF THE PREFERRED EMBODIMENTS

Figure 1:
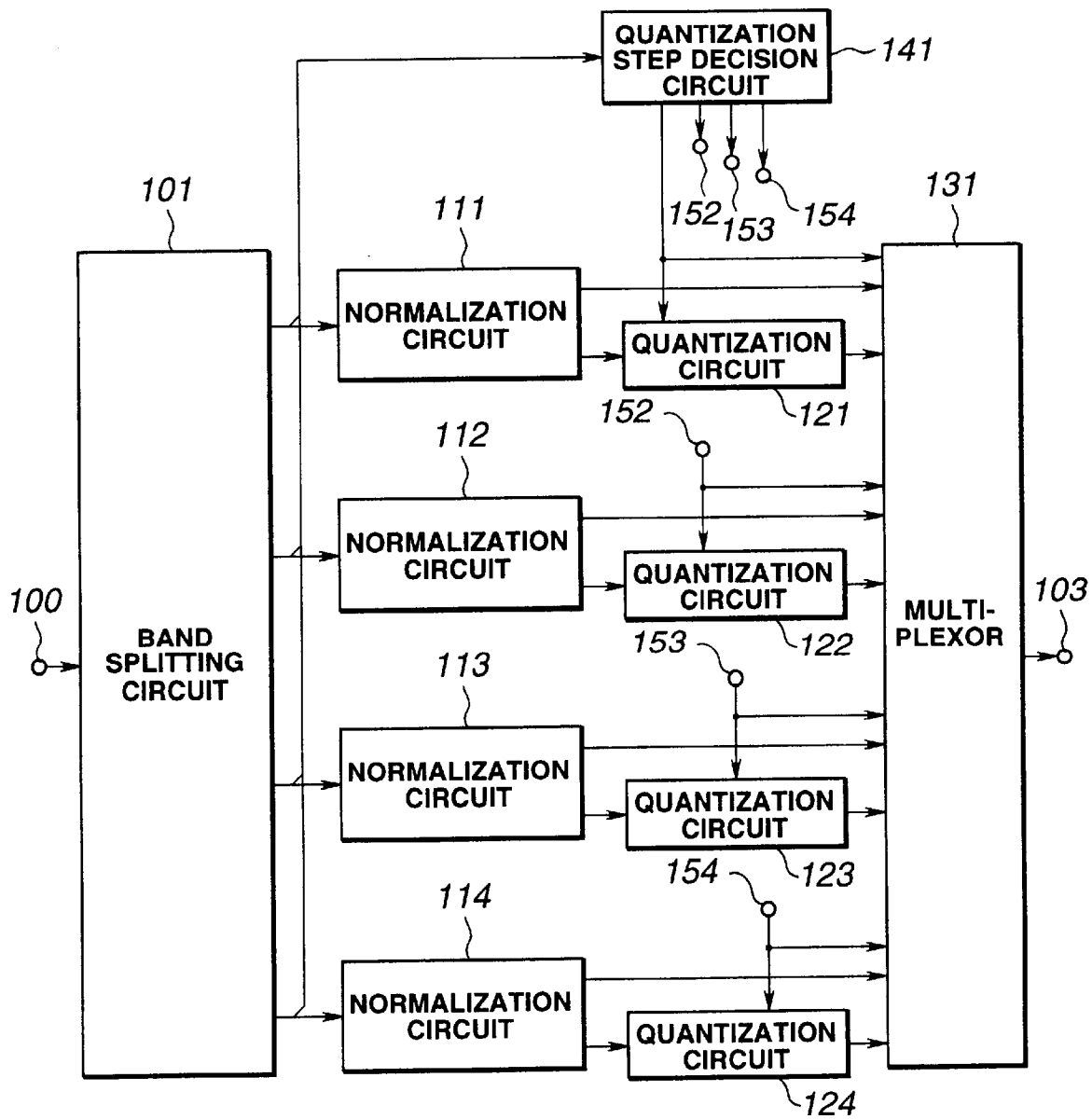
FIG. 1 is a schematic block circuit diagram showing the construction of an information encoding apparatus embodying the present invention.

Referring to the drawings, preferred embodiments of the present invention will be explained in detail.

In FIG. 1, there is shown, in a block circuit diagram, an embodiment of the information encoding apparatus (encoder) for carrying out the information encoding method of the present invention.

Referring to FIG. 1, an audio signal entering the encoder via an input terminal 100 is spilt into plural frequency bands by a band-splitting circuit 101 also having the function as forward orthogonal transform means. As band-splitting means in the band-splitting circuit 101, means consisting in grouping spectral components resulting from orthogonal transform, such as MDCT, into plural frequency bands, or means in orthogonally transforming the audio signal divided into plural frequency bands by a filter bank and grouping the resulting spectral components into respective frequency bands. The frequency bands may be of equal widths or non-uniform widths in order to take account of psychoacoustic characteristics of the human hearing system. Although the frequency spectrum of the audio signal is divided into four bands in FIG. 1, the number of bands may naturally be larger or lesser than four.

The spectral signals divided in frequency by the band-splitting circuit 101 are normalized by normalization circuits 111, 112, 113 and 114 associated with the respective frequency bands from one time block to another so as to be resolved into normalization coefficients and normalized signals. The normalized signals are quantized by quantization circuits 121, 122, 123 and 124, based upon the quantization step information outputted by a quantization step decision circuit 141, so as to be converted into normalized quantized signals. The quantization step decision circuit 141 determines the quantization step, that is bit allocation, by utilizing the acoustic masking effects which take account of psychoacoustic characteristics of the human hearing system. Referring to FIG. 1, the quantization step information sent to the quantization circuits 122, that sent to the quantization circuit 123 and that sent to the quantization circuit 124 are sent thereto via terminals 152, 153 and 154, respectively.

The normalized and quantized signals from the quantization circuits 121 to 124, the normalization coefficients from the normalization circuits 111 to 114 and the quantization step information from the quantization step decision circuit 141 are multiplexed into a codestring by a multiplexor 131 which is outputted at a terminal 103. The codestring is subsequently recorded on a disc-shaped recording medium, such as an optical disc, a magneto-optical disc or a magnetic disc, a tape-shaped recording medium, such as a magnetic tape, or a semiconductor memory, such as an IC card, or transmitted over a transmission system, such as electrical waves or optical cable.

In the embodiment of FIG. 1, the quantization step decision circuit 141 determines the quantization step information based upon respective signals split into frequency bands by the band-splitting circuit 101. However, the quantization step information may also be calculated from the audio signal entering the terminal, that is the audio signal not divided into frequency bands as yet. Alternatively, the quantization step information may also be calculated based upon the normalization coefficients from the normalization circuits 111 to 114. In addition, calculations by the quantization step decision circuit 141 may be made based upon a psychoacoustic phenomenon, such as masking effect. It is noted that the quantization step information is outputted by the multiplexor 131 so as to be subsequently sent to a decoder, it is possible to set the psychoacoustic model employed in the encoder in any desired optional manner.

Figure 2:
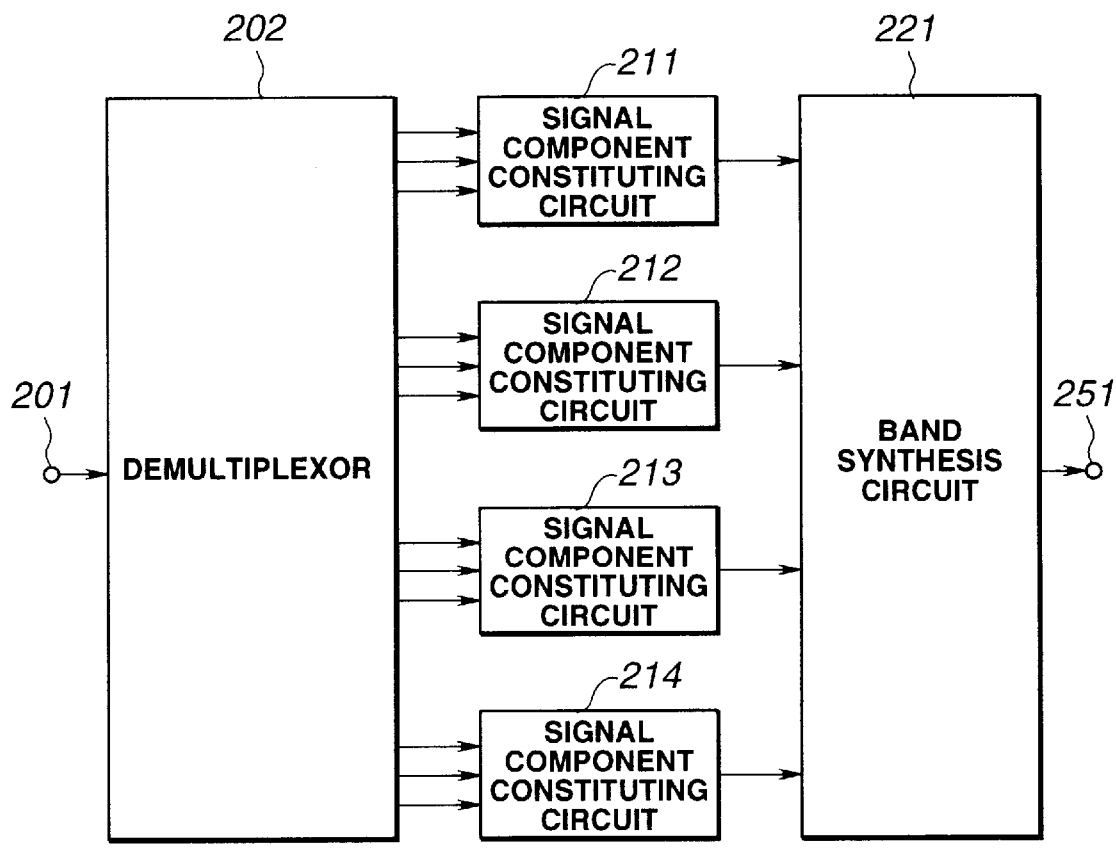
FIG. 2 is a schematic block circuit diagram showing the construction of an information decoding apparatus embodying the present invention.

FIG. 2 shows, in a block circuit diagram, an embodiment of an information decoding apparatus (decoder) which is a counterpart apparatus of the encoder shown in FIG. 1.

Referring to FIG. 2, the coded information entering a terminal 201 of the decoder of the present embodiment, that is the above-mentioned codestring, is sent to a demultiplexor 202 where it is divided and restored into the quantization step information, normalization coefficients and the normalized and quantized signals on the band basis. The quantization step information, normalization coefficients and the normalized and quantized signals on the band basis are sent to signal component constituting circuits 211, 212, 213 and 214 having the function as decoding means for the respective bands so as to be assembled into signal components from one frequency band to another. The signal components from these signal component constituting circuits 211, 212, 213 and 214 are sent to signal component constituting circuits 211, 212, 213 and 214 where signal components are constituted on the band basis. The signal components from these signal component constituting circuits 211, 212, 213 and 214 are synthesized by a band synthesis circuit 221 also having the function as orthogonal transform means so as to be outputted as audio signals at a terminal 251.

Figure 3:
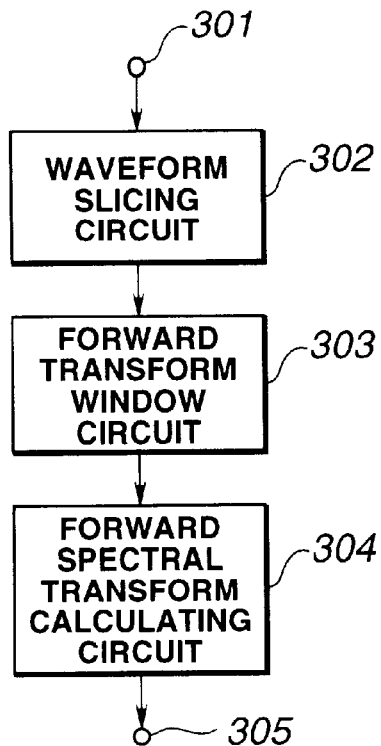
FIG. 3 is a block circuit diagram showing the construction of forward orthogonal transform means.
Figure 4:
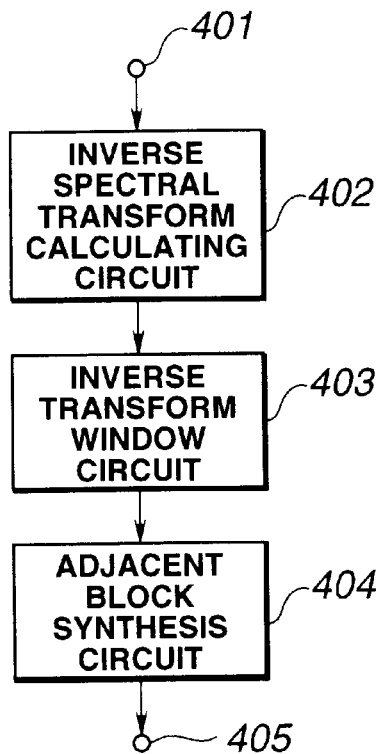
FIG. 4 is a block circuit diagram showing the construction of inverse orthogonal transform means.

FIG. 3 shows an illustrative construction of forward orthogonal transform means in case of employing MDCT in the band-splitting circuit 101 of FIG. 1, while FIG. 4 shows an illustrative construction of inverse orthogonal transform means in case of employing IMDCT in the band-synthesis circuit 221 of FIG. 2.

Referring to FIG. 3, the signal entering the terminal 100 of FIG. 1, or the audio signal split into frequency bands by a filter bank, is supplied to a terminal 301. This input signal is supplied to a waveform slicing circuit 302, thence to a forward orthogonal transform windowing circuit 303 and thence to a forward orthogonal transform calculating circuit 304. The waveform slicing circuit 302 slices the signal waveform supplied to the terminal 301, while the forward orthogonal transform windowing circuit 303 and the forward orthogonal transform calculating circuit 304 perform calculations of equations (1) and (2), respectively:

$$x_{1,J}(n) = w_1(n)x(n+JM) \quad 0 \leq n < 2M \tag{1}$$

$$X_J(k) = \frac{2}{M} \sum_{n=0}^{2M-1} x_{1,J}(n)\cos\left(\frac{\pi(2k+1)(2n+M+1)}{4M}\right), \tag{2}$$

$$0 \leq k < M$$

where J denotes a block number, M denotes the number of output spectral components, x(n) denotes an input waveform signal, $X_J(k)$ denotes the number of output spectral components, as found from one block to another, and $w_1(n)$ denotes a forward orthogonal transform window function.

Also, referring to FIG. 4, output signals of signal component constituting circuits 211 to 214 of FIG. 2 are supplied to a terminal 401. These output signals are sent to an inverse orthogonal transform calculating circuit 402, thence to an inverse orthogonal transform windowing circuit 403 and thence to a neighboring block synthesis circuit 404. The circuits 402, 403 and 404 perform calculations of the equations (3), (4) and (5), respectively.

$$X_{2,J} = \sum_{n=0}^{M-1} X_J(k)\cos\left(\frac{\pi(2k+1)(2n+M+1)}{4M}\right), \tag{3}$$

$$0 \leq n < 2M$$

$$x_{3,J} = w_2(n)x_{2,J}(n) \quad 0 \leq n < 2M \tag{4}$$

$$y(n+JM) = x_{3,J-1}(n+M) + x_{3,J}(n) \quad 0 \leq n < M \tag{5}$$

where J denotes a block number, M denotes the number of output spectral components, $X_J(k)$ denotes the number of input spectral components, applied on the block basis, y(n) denotes an output waveform signal, and $w_2(n)$ denotes an inverse orthogonal transform windowing function.

Assuming that no information loss has been caused by encoding, y(n) as found by the equation from the equation (1) being coincident with x(n) means that the original waveform signal has been restored correctly. This represents an indispensable condition if the encoding and decoding means for the waveform signals should exhibit sufficient performance.

From the equations (2) and (3), the following equation (6) is derived:

$$x_{2,J}(n) = \sum_{k=0}^{M-1}\left(\frac{2}{M}\sum_{m=0}^{2M-1}x_{1,J}(m)\cos\left(\frac{\pi(2k+1)(2m+M+1)}{4M}\right)\right) \times \tag{6}$$

$$\left(\cos\left(\frac{\pi(2k+1)(2n+M+1)}{4M}\right)\right) =$$

$$\frac{2}{M}\sum_{k=0}^{M-1}\sum_{m=0}^{2M-1}x_{1,J}(m)\cos\left(\frac{\pi(2k+1)(2n+M+1)}{4M}\right) \times$$

$$\cos\left(\frac{\pi(2k+1)(2m+M+1)}{4M}\right) =$$

$$\frac{2}{M}\sum_{m=0}^{2M-1}x_{1,J}(m)\sum_{k=0}^{M-1}\cos\left(\frac{\pi(2K+1)(2m+M+1)}{4M}\right) \times$$

$$\cos\left(\frac{\pi(2k+1)(2m+M+1)}{4M}\right) =$$

$$\frac{1}{M}\sum_{m=0}^{2M-1}x_{1,J}(m)\sum_{k=0}^{M-1}\left(\cos\left(\frac{\pi(2k+1)(n+m+M+1)}{2M}\right) + \right.$$

$$\left. \cos\left(\frac{\pi(2k+1)(m-n)}{2M}\right)\right)$$

$$0 \leq n \leq 2M-1$$

Since the following equation (7):

$$\sum_{k=0}^{k-1}\cos((2k+1)\omega)$$

$= K$ if $\omega = 2N\pi$ $-K$ if $\omega = (2N+1)\pi$ $\sin(2K\omega)/2 \sin(\omega)$ otherwise $\tag{7}$ holds, the equations (8) and (9):

$$\sum_{k=0}^{M-1}\cos\left(\frac{\pi(2k+1)(n+m+M+1)}{2M}\right)$$

$= M$, $m = 3M-1-n$ and $M \leq n \leq 2M-1$ $-M$, $m = M-1-n$ and $0 \leq n \leq M-1$ 0, otherwise $\tag{8}$ $$\sum_{k=0}^{M-1} \cos\left(\frac{\pi(2k+1)(n-m)}{2M}\right)$$

$$= M,\ m=n$$

$$0,\ \text{otherwise} \quad (9)$$

hold, so that ultimately the equation (10):

$$x_{2,J}(n) = -x_{1,J}(M-1-n) + x_{1,J}(n), 0 \leq n \leq M-1$$

$$x_{1,J}(3M-1-n) + x_{1,J}(n), M \leq n \leq 2M-1 \quad (10)$$

holds.

Further, since the equation (11)

$$y(n+JM) = w_2(n+M)[w_1(2M-1-n)x((J+1)M-1-n) + w_1(n+M)x(JM+n)] + w_2(n)[-w_1(M-1-n)x((J+1)M-1-n) + w_1(n)x(JM+n)] \quad (11)$$

is derived from the equations (4), (5) and (10), the following equations (12) and (13):

$$w_1(n)w_2(n) + w_1(n+M)w_2(n+M) = 1\ \ 0 \leq n < M \quad (12)$$

$$w_1(2M-1-n)w_2(n+M) - w_1(M-n-1)w_2(n) = 0\ \ 0 \leq n < M \quad (13)$$

represent necessary and sufficient conditions in order for x(n) and y(n) to be coincident with each other.

If a condition that the forward orthogonal transform function and an inverse orthogonal transform function are coincident and symmetrical with each other is added, as shown in the equations (14) and (15):

$$w_1(n) = w_2(n) = w(n)\ \ 0 \leq n < 2M \quad (14)$$

$$w(2M-1-n) = w(n)\ \ 0 \leq n < M \quad (15)$$

The equations (12) and (13) become equivalent to the equation (16):

$$w^2(n) + w^2(M-1-n) = 1\ \ 0 \leq n < M \quad (16)$$

Ultimately, the equations (14), (15) and (16) become sufficient conditions in order for x(n) and y(n) to be coincident with each other. Consequently, the windowing function of the equation (17):

$$w(n) = \sin\left(\frac{\pi(n+0.5)}{2M}\right),\ 0 \leq n < 2M \quad (17)$$

has so far been used as the forward transform windowing function and the inverse transform windowing function for MDCT.

However, under the constraint of the equation (16), the value of the forward transform windowing function in $n_0$ is placed under constraint depending on the value of the forward transform windowing function at $M-1-n_0$, so that it has been difficult to design so that the forward transform windowing function will have a sufficiently high degree of frequency separation.

Figure 5A:
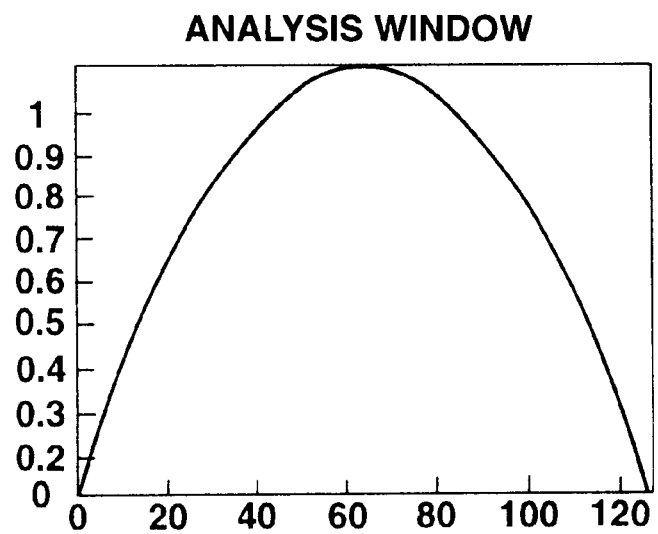
FIGS. 5A to 5C illustrate an example of results of orthogonal transform employing a window function of the equation (17), where M=6.
Figure 5B:
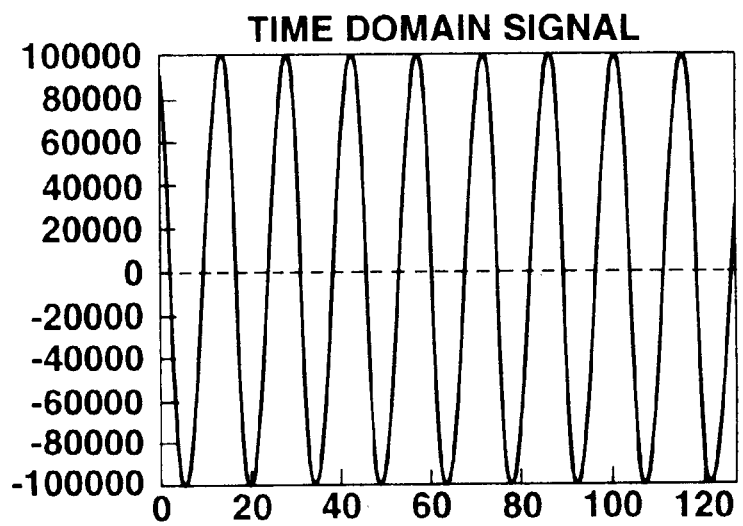
Figure 5C:
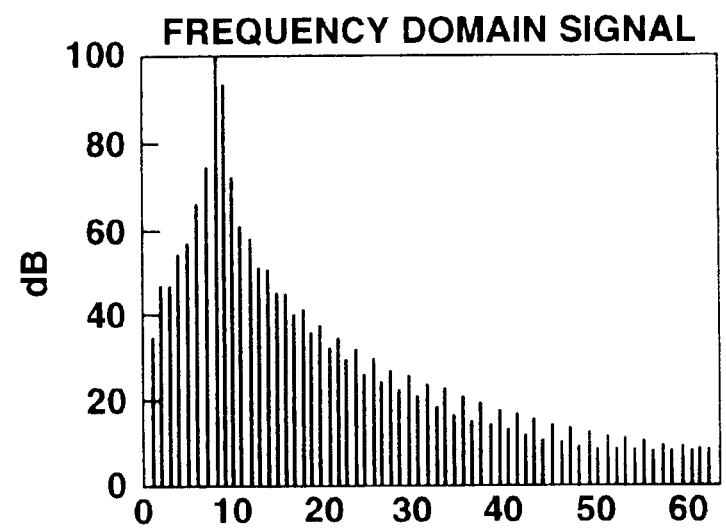
Figure 6A:
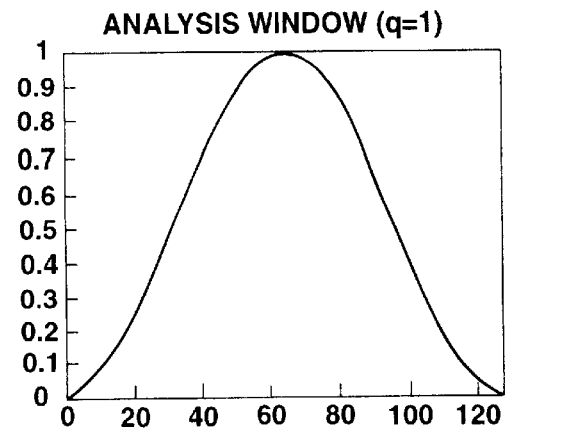
FIGS. 6A to 6D illustrate the case of using a forward transform window function (21) where q=1, with M=64.
Figure 6B:
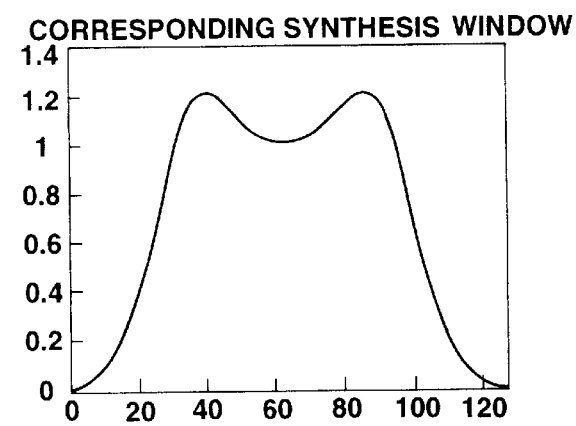
Figure 6C:
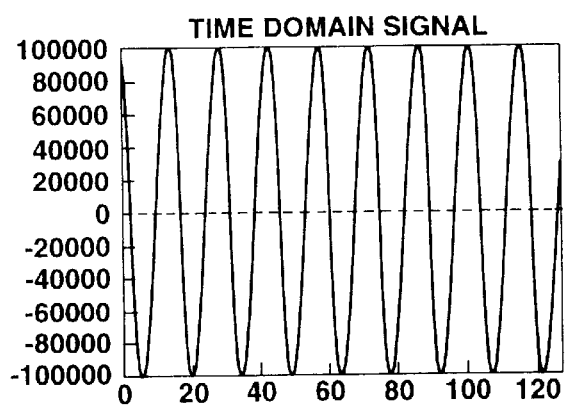
Figure 6D:
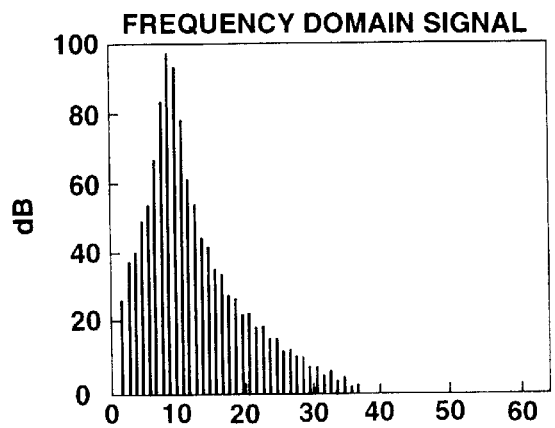
Figure 7A:
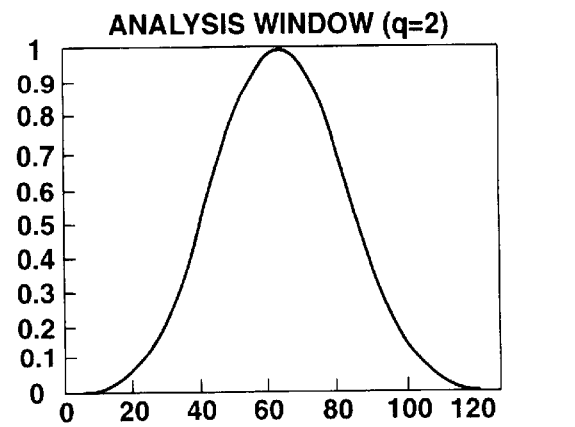
FIGS. 7A to 7D illustrate the case of using a forward transform window function (21) where q=1, with M=64.
Figure 7B:
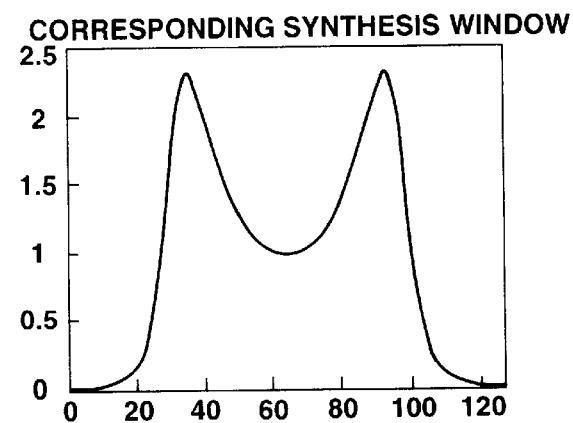
Figure 7C:
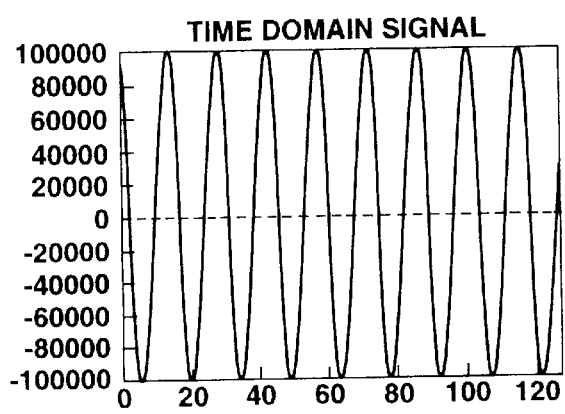
Figure 7D:
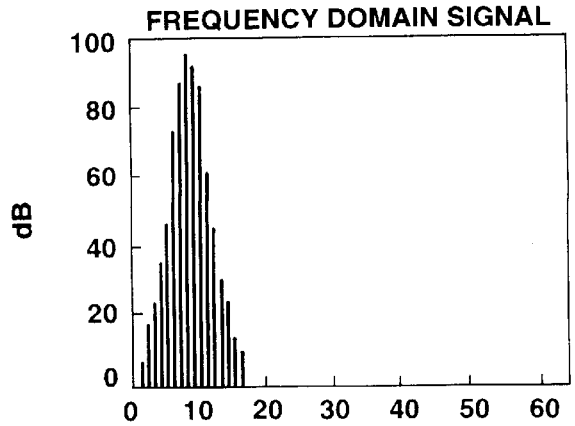

FIGS. 5A to 5C show an example of results of orthogonal transform in case of using a windowing function for M=64. That is, FIGS. 5A, 5B and 5C illustrate a curve showing the shape, that is characteristics, of the windowing function, an input waveform signal sampled from a sine wave, and spectral components obtained on MDCT of the input waveform signal using the above windowing function, respectively. The curve of FIG. 5A may also be a polygonal line for discrete values, such as sampling values. In general, if the shape of the windowing function for orthogonal transform is not sufficiently smooth, the spectral components obtained on MDCT using the windowing function are not increased in energy level concentration such that the energy distribution is spread apart. Therefore, with the windowing function which rapidly approaches zero towards both ends, as shown in FIG. 5A, the distribution of the spectral components obtained on MDCT with the use of the windowing function is not sufficiently small at the skirts with respect to the peak. Thus, for correctly encoding the signals exhibiting a spread-apart spectral distribution as shown in FIG. 5C, these numerous spread-apart spectral signals need to be encoded with high accuracy. This, however, is not desirable for increasing the encoding efficiency.

In this consideration, the conditions of the equation (14) stating that the forward orthogonal transform windowing function should be coincident with the inverse orthogonal transform windowing function is eliminated in the present embodiment. The forward orthogonal windowing function is given a sufficiently high degree of frequency separation, while the inverse transform windowing function is set so as to satisfy the equations (12) and (13) with the forward orthogonal transform windowing function.

For example, if, after modifying the condition for symmetry of the equation (15) to the conditions for symmetry according to the equations (18) and (19), $w_2(n)$ is set as shown by the equation (20):

$$w_2(n) = \frac{w_1(n)}{w_1^2(n) + w_1^2(M-1-n)},\ 0 \leq n < M \quad (20)$$

this satisfies the conditions of the equations (12) and (13), so that the original waveform signals may be restored on application of forward orthogonal transform and inverse orthogonal transform.

In this case, since the forward orthogonal transform windowing function can be set without being placed under the constraint as shown in the equation (16), a sufficiently high degree of frequency separation may be achieved. It should be noted that a non-symmetrical window shape is not effective in increasing the degree of frequency separation, while the symmetrical windowing functions as shown by the equations (18) and (19):

$$w_1(2M-1-n) = w_1(n)\ \ 0 \leq n < M \quad (18)$$

$$w_2(2M-1-n) = w_2(n)\ \ 0 \leq n < M \quad (19)$$

are convenient since the number of the coefficient information data can be halved.

FIGS. 6A to 6D illustrate the results of orthogonal transform in case of employing a forward orthogonal transform windowing function of the following equation (21):

$$w_1(n) = \left(\frac{\cos\left(\frac{\pi(n-M+0.5)}{M}\right) + 1}{2}\right)_q,\ 0 \leq n < 2M \quad (21)$$

where q=1. That is, FIGS. 6A to 6D illustrate the shape of a forward orthogonal transform windowing function, the shape of an inverse orthogonal transform windowing function, an input waveform signal sampled from a sine wave, and spectral components obtained on MDCT of the input waveform signal, respectively.

The inverse orthogonal transform windowing function has been found from the equation (20) and differs from the forward orthogonal transform windowing function. With the present example, the skirts of the spectral signals become narrower than with the example of FIG. 5, so that the degree of frequency separation is higher.

FIGS. 7A to 7D illustrate the results of orthogonal transform in case of employing a forward orthogonal transform windowing function of the equation (21), with M=64. With the example of FIG. 7, the skirts of the spectral signals are narrower than with the example of FIG. 6. However, the maximum value of the inverse transform window function is as large as not less than 2. The larger value of the inverse transform windowing function is not desirable since the quantization noise inverse transformed on the time axis is also amplified in level by this inverse transform windowing function. In particular, if the input signal exhibits inherently flatter energy distribution on the frequency axis, the frequency separation degree of the forward orthogonal windowing function has only small effect in improving the encoding efficiency, so that it is not preferred to set the maximum value of the inverse transform windowing function so as to be not less than 2.

However, since the human hearing sense is more sensitive to the tonal signal having its energy concentrated in a particular isolated frequency range, it is more preferred to set the forward orthogonal transform windowing function for improving the frequency separation degree as much as possible, if the absolute value of the inverse transform windowing function can be suppressed to a value on the order of 1.2 as in the example of FIG. 6.

As discussed above, the higher value of the frequency separation degree is effective in particular in improving the encoding efficiency of tonal signals. However, this effect becomes more pronounced if the following methods are used for encoding.

The first method employs a variable length codes of allocating codes of shorter lengths and those of longer lengths for quantized values occurring more frequently and those occurring less frequently, respectively. That is, since a large number of spectral components are quantized to zero, and codes of shorter lengths are allocated to the quantized value equal to zero, the encoding efficiency becomes higher if the frequency separation degree is raised and the number of the spectral components quantized to zero is increased.

The second method, disclosed in the above-referenced international application PCT/JP94/00,880, is separating acoustically crucial tonal signals from the spectral signals and encoding the separated signals distinctly from the remaining spectral signals. If the frequency separation degree is raised and the number of spectral components quantized to zero is increased, the number of the spectral signals deemed to constitute tonal components can be decreased and the respective tonal components can be expressed by shorter codes, thus raising the encoding efficiency.

In the above examples, the transform windowing function is deemed to be given in its entirety by the equation (21). Such limitation can, however, be relaxed, as is now to be explained.

Figure 8A:
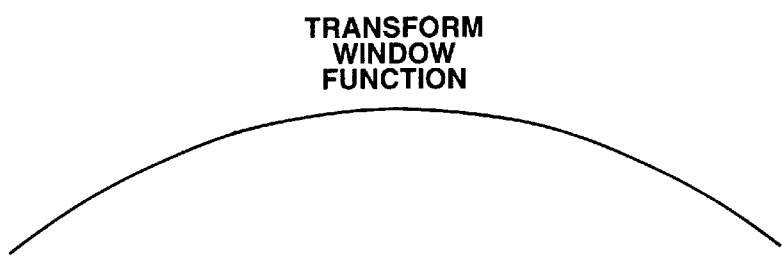
FIGS. 8A and 8B illustrate the manner in which the quantization noise is applied to spectral signals resulting from forward orthogonal transform of waveform signals using a window function.
Figure 8B:
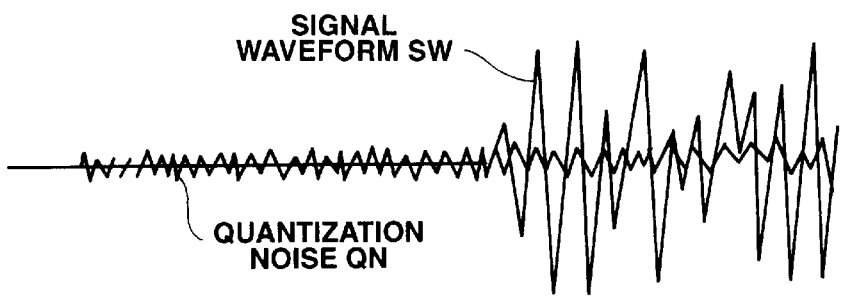

If, as shown in FIG. 8, the quantization noise is added to spectral signals obtained on forward orthogonal transforming a waveform signal using a windowing function of FIG. 8A (orthogonal transform windowing function), and the spectral signals thus carrying the quantization noise is inverse orthogonal transformed to time-domain waveform signals, the quantization signal is spread within the entire transform block. If the signal waveform SW is increased partway in the transform block as shown in FIG. 8B, the quantization noise QN is increased relative to the signal waveform SW even in the domain in which the original signal waveform SW is small. Thus the concurrent masking is not operative and the quantization noise proves hindrance to the acoustic sense as pre-echo.

Figure 9:
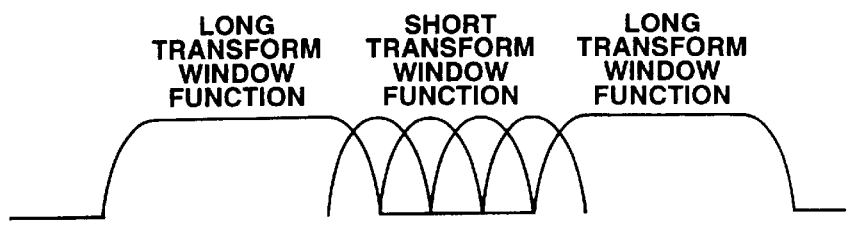
FIG. 9 illustrates an example of a conventional window function devised for reducing acoustic hindrances caused by pre-echo.

FIG. 9 illustrates an example of the prior-art technique devised for reducing the acoustic hindrance caused by pre-echo. In general, a longer transform block length is preferred for a quasi-stationary signal waveform since then the energy is concentrated in a particular spectral coefficients thus raising the encoding efficiency. However, if the sound amplitude is changing rapidly, the transform block length may be shortened for sufficiently reducing the period of occurrence of the pre-echo since then the backward masking by the original signal becomes effective to eliminate hindrance to the acoustic sense. With the method of FIG. 9, this information is utilized for selectively switching the transform block length depending upon properties of respective portions of the signal waveform.

Figure 10:
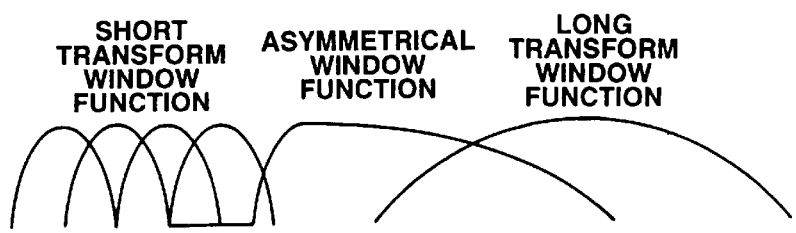
FIG. 10 illustrates a window function which is non-symmetrical between a short transform portion and a long transform portion.

As a variation of the method of FIG. 9, and as illustrated in FIG. 10, a method has also been proposed in which a block having a non-symmetrical windowing function is sandwiched between the short transform section and the long transform section. By so doing, the windowing function can be extended throughout the transform area in its entirety without the necessity of reducing both ends to zero, thus raising the degree of concentration of the energy distribution on orthogonal transform thus raising the encoding efficiency.

Figure 11:
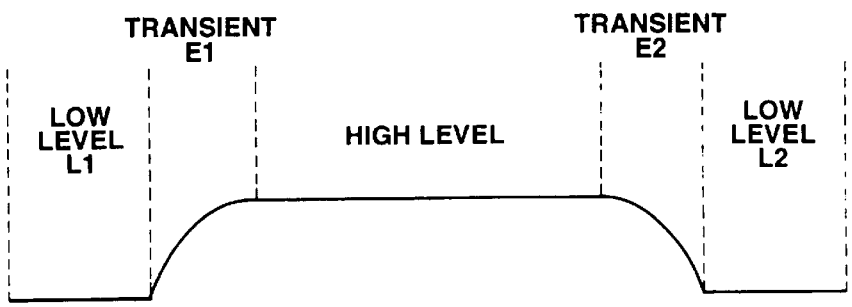
FIG. 11 illustrates the shape of a forward transform window function of MDCT.

The forward transform windowing function may be represented as having a shape shown in FIG. 11. A high-level portion and a low-level portion may occasionally be construed as being omitted. According to the present invention, the shape of the windowing function is defined for transient portions E1 and E2 of FIG. 11. If the shape of these portions are given by halving and shifting the window shaped as defined by the equation (21), the above observation is encompassed within the method of the present invention.

Meanwhile, the above-mentioned pre-echo may be inhibited by gain control, as described in JP Patent Application No. 6-13017 assigned to the present Assignee. In such case, the frequency separation degree may be raised without switching the block lengths by taking advantage of the windowing function made up only of transient portions.

The above-mentioned relation between the shape of the windowing function and the spreading of the spectral components holds if the windowing function for forward orthogonal transform is multiplied by a constant number at the time of orthogonal transform by the encoding means of the encoder and division is made by the same constant at the time of inverse transform by the decoding means of the decoder. In such case, the above-mentioned comparison is to be made after correcting such changes in the constant number multiplication of the windowing function.

Figure 12:
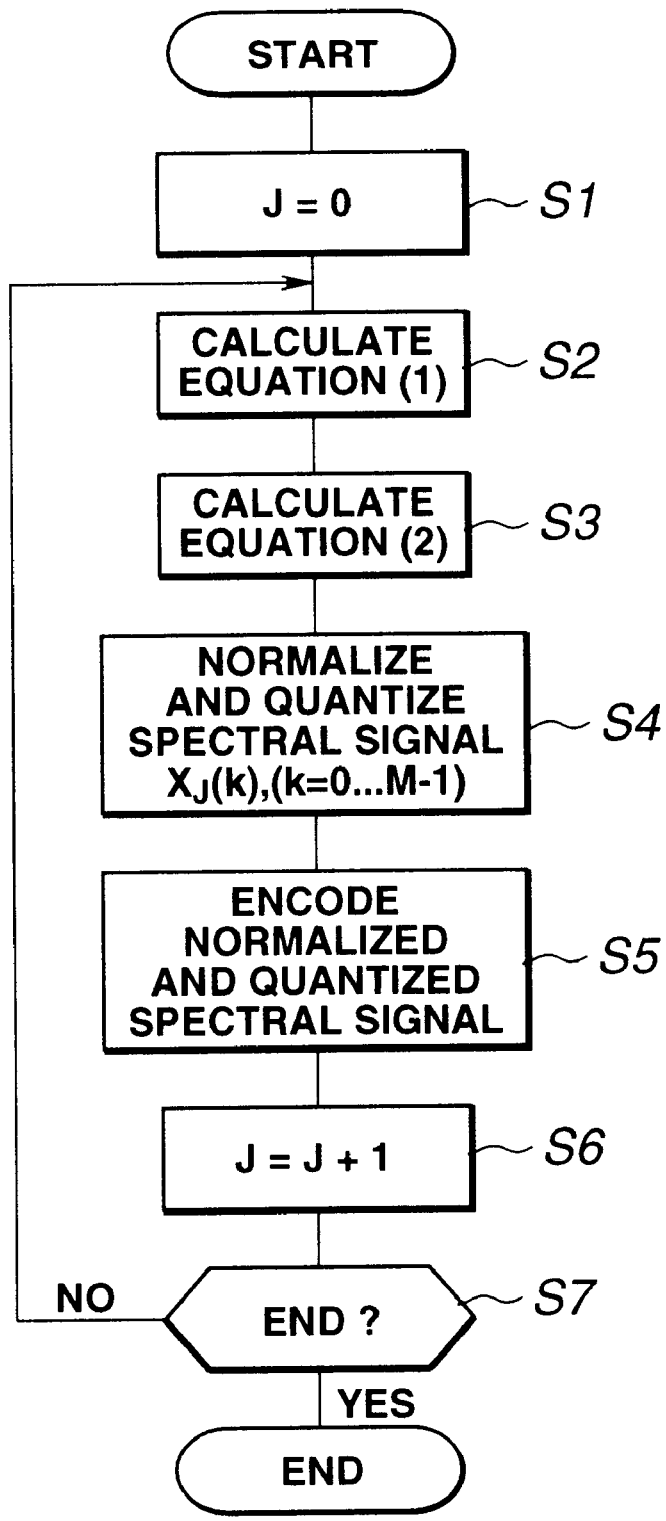
FIG. 12 is a flow chart showing the processing flow of the information encoding method of the present invention.
Figure 13:
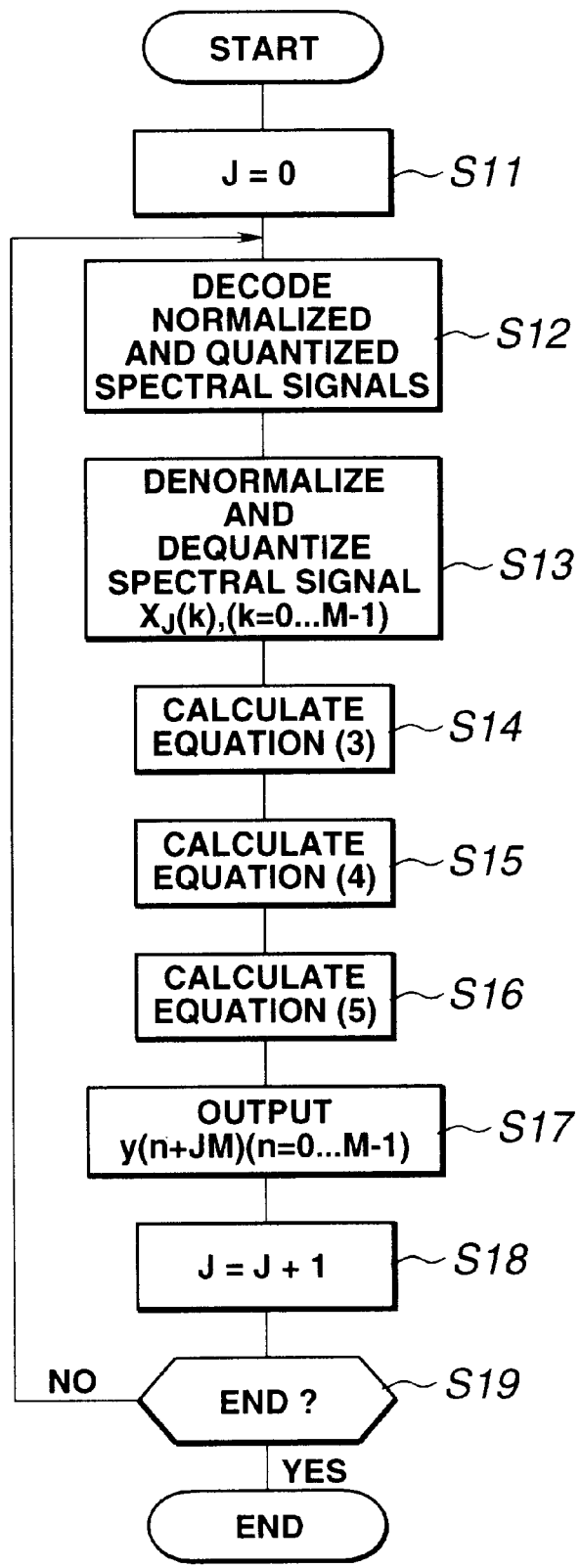
FIG. 13 is a flow chart showing the processing flow of the information decoding method of the present invention.

FIGS. 12 and 13 show illustrate processing flow for encoding and decoding according to the method of the present invention.

Referring to FIG. 12, the block number J is set at step S1 to zero (J=0). At the next steps S2 and S3, the equations (2) and (3) are calculated, respectively. At step S4, the produced spectral signals are normalized and quantized. At step S5, the normalized and quantized spectral signals are encoded. At step S6, the block number J is incremented. At step S7, it is judged whether or not the processing is to come to a close. If the result is NO, the program reverts to step S2 and, if otherwise, the processing is terminated.

Referring to FIG. 13, the block number J is set to zero (J=0). At the next step S12, the normalized and quantized spectral signals are decoded. At step S13, the resulting spectral signals are denormalized and dequantized. At the next step S14, the equation (3) is calculated. At steps S15 and S16, the equations (4) and (5) are calculated, respectively. At the next step S17, the resulting waveform signal is outputted. At the next step S18, the block number J is incremented. At step S19, it is judged whether or not the processing is to come to a close. If the result of judgment is NO, the program reverts to step S12 and, if otherwise, the program is terminated.

Although the above description has been made with reference to the band-splitting circuit 101 configured for direct MDCT and the band synthesis circuit 221 configured for direct IMDCT, the present invention may be applied if alternative methods are used for band splitting and band synthesis.

Figure 14:
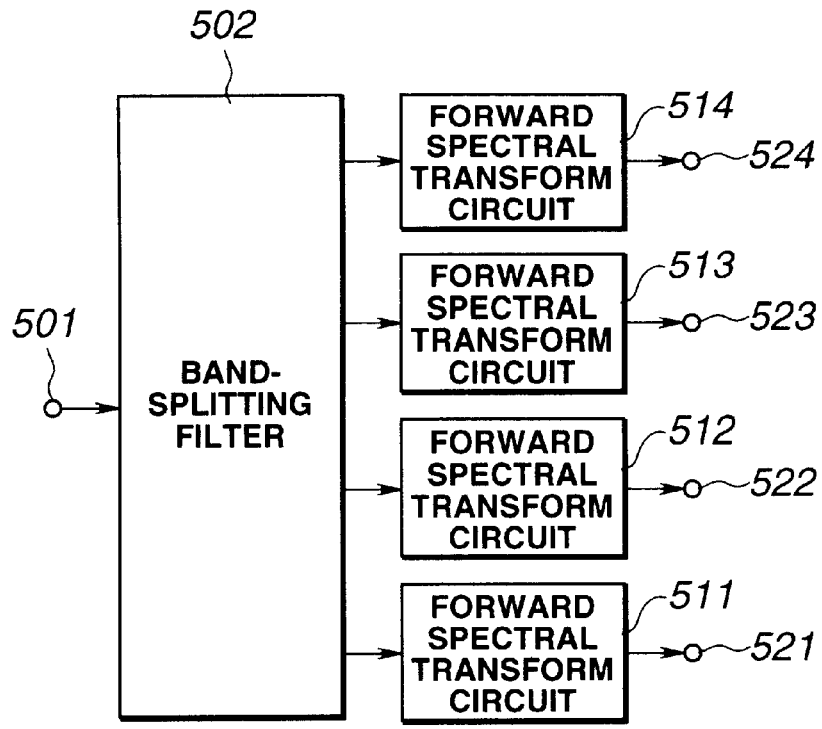
FIG. 14 is a block circuit diagram showing an illustrative example of combining a band-splitting filter as band-splitting means and forward orthogonal transform means such as MDCT.
Figure 15:
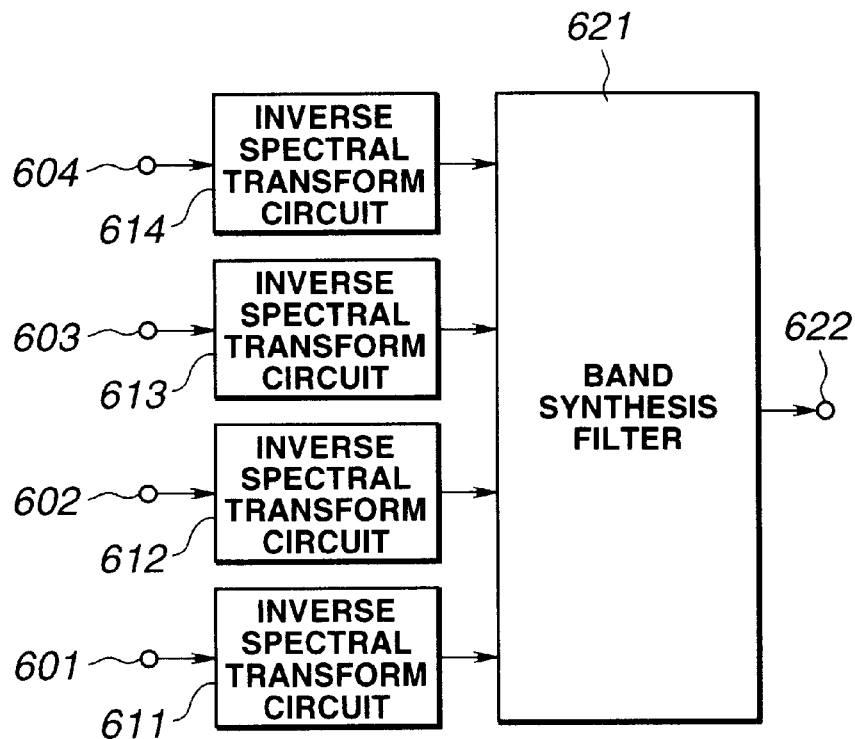
FIG. 15 is a block circuit diagram showing an illustrative example of combining forward orthogonal transform means such as IMDCT as band synthesizing means and a band-synthesizing filter.

FIG. 14 shows an illustrative example of using the combination of a band-splitting filter 502 and orthogonal transform circuits 511 to 514 such as MDCT circuits as band-splitting means. FIG. 15 shows an illustrative example of using the combination of inverse orthogonal transform circuits 611 to 614, such as IMDCTs, and a band-synthesis filter 621, as band-synthesis means.

Referring to FIG. 14, the signal from the terminal 100 of FIG. 1 is fed to a terminal 501. This signal is divided by the band-splitting filter 502 into plural frequency bands and the resulting signals of the respective frequency bands are fed to the forward orthogonal transform circuits 511 to 514. The forward orthogonal transform circuits 511 to 514 orthogonal transform the signals using the forward orthogonal transform windowing function as discussed above and the resulting orthogonal transformed signals are sent via associated terminals 521 to 524 to normalization circuits 111 to 114 of FIG. 1, respectively.

Referring to FIG. 15, the signals from the signal component constituting circuits 211 to 214 of FIG. 2 are sent to terminals 601 to 604 and thence supplied to the associated inverse orthogonal transform circuits 611 to 614. The inverse orthogonal transform circuits 611 to 614 orthogonal transform the signals using the inverse orthogonal transform windowing function as discussed above and the resulting inverse orthogonal transformed signals are sent to the band-synthesis filter 621 where they are synthesized and outputted at a terminal 622. An output signal of the terminal 622 is sent to a terminal 251 of FIG. 2.

The forward orthogonal transform circuits 511 to 514 may each be configured as shown in FIG. 3, while the inverse orthogonal transform circuits 611 to 614 may each be configured as shown in FIG. 4. The present invention may be applied to these cases.

The forward transform windowing function as defined by the equation (21) is meant to comprise the above observations.

Figure 16:
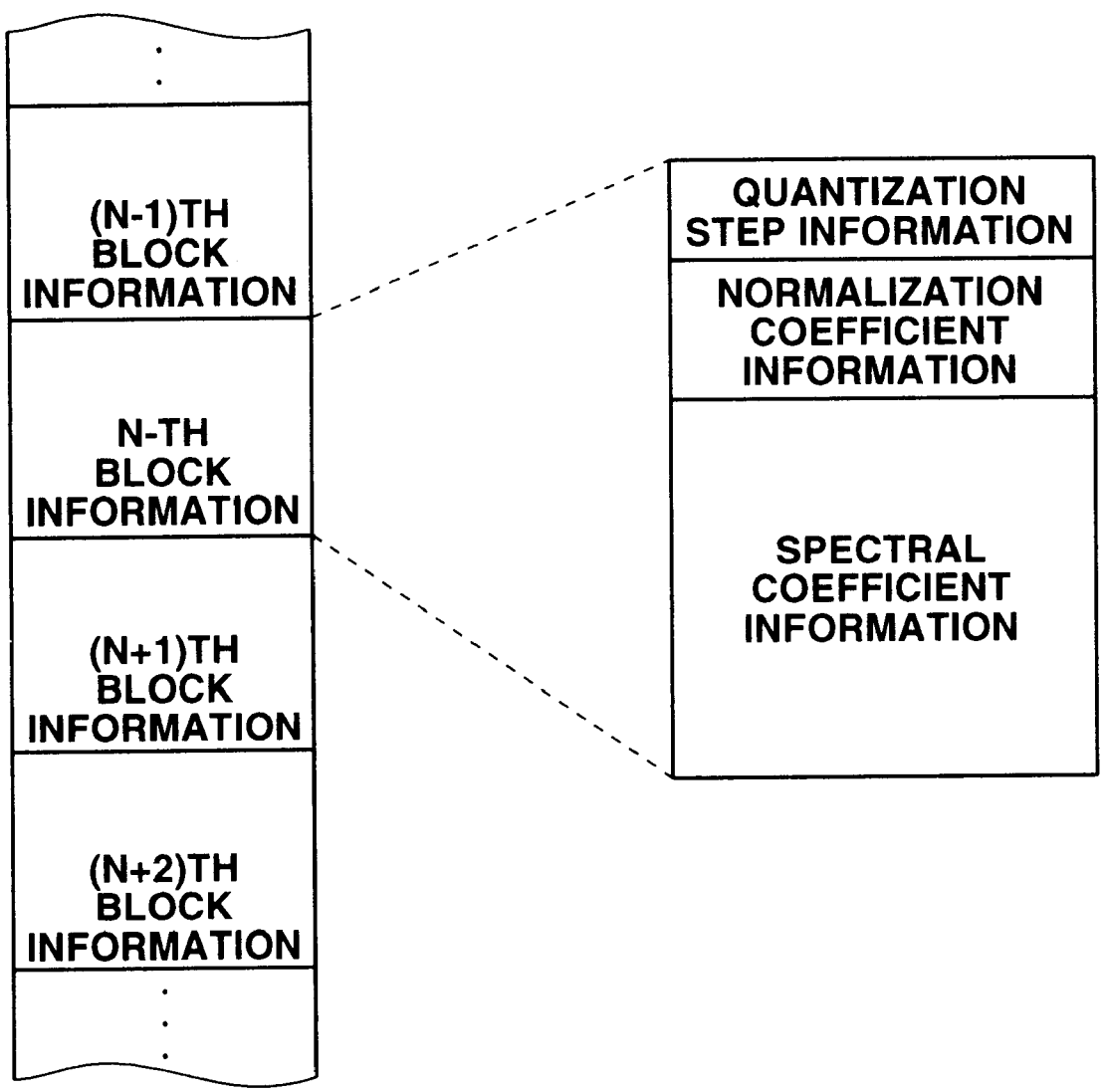
FIG. 16 illustrates an illustrative code obtained on application of the information encoding method of the present invention to waveform signals.

FIG. 16 shows an example of codes (a codestring) obtained by applying the present invention to waveform signals. These codes may be recorded on a recording medium or transmitted on a transmission path. In the present example, the waveform signal is transformed by MDCT on the block basis and the resulting spectral signals are normalized and quantized for encoding. That is, in the embodiment shown in FIG. 16, the code information of each block is comprised of the quantization step information, normalization coefficient information and the spectral coefficient information.

The foregoing description has been made of the case of employing MDCT as orthogonal transform means of conflicting waveform elements between neighboring blocks at the time of inverse transform. The use of MDCT is convenient in that orthogonal transform may be realized in which the same equation may be used for calculating the totality of blocks. However, the present invention may be applied to cases of employing alternative orthogonal transform methods for conflicting waveform elements between neighboring blocks. Such another example of orthogonal transform is discussed in J. P. Princen and A. B. Bradley, IEEE Transaction on Acoustics, Speech and Signal Processing, in "Analysis/Synthesis Filter Bank Design Based on Time Domain Aliasing Cancellation, Vol. ASSP-34 No. 5, October 1986.

The forward orthogonal transform windowing function according to the present invention may be employed for orthogonal transform other than orthogonal transform of conflicting waveform elements between neighboring blocks.

Although the present invention has been described in connection with acoustic waveform signals, the present invention may be applied to other sorts of signals, such as picture signals. However, the favorable effect of the method of the present invention is displayed most significantly if applied to signals exhibiting particularly acute spectral distribution. Since the encoding of particularly high accuracy is required if the signals are acoustic signals exhibiting such spectral distribution, the present invention may be utilized most effectively in such case. In addition, the present invention may be applied not only to the case of recording the encoded information on a recording medium but also to the case of transmitting the information.

What is claimed is:

1. An information encoding method for encoding information, comprising the steps of:

forward orthogonal transforming an input signal using a windowing function for forward orthogonal transform so that, on inverse orthogonal transform, waveform elements are conflicted between neighboring blocks for forming waveform signals; and encoding output spectral signals produced by the forward orthogonal transform; wherein the shape of the windowing function for forward orthogonal transform employed in the forward orthogonal transform is different from that of a windowing function for inverse orthogonal transform employed for inverse orthogonal transform; and further wherein the shape of transient portions of the windowing function for forward orthogonal transform are obtained by dividing a window obtained by the equation:

$$w_1(n) = \left(\frac{\cos\left(\frac{\pi(n - M + 0.5)}{M}\right) + 1}{2}\right) q, \; 0 \leq n < 2M$$

into two and shifting where $w_1(n)$ is the windowing function for forward orthogonal transform, q is a value close to 1 and M is a selected number of output spectral components.

2. The information encoding method as claimed in claim 1, wherein the maximum value of said windowing function for inverse orthogonal transform does not exceed a value equal to twice a median value of the windowing function for inverse orthogonal transform.

3. The information encoding method as claimed in claim 1, wherein the forward orthogonal transform is modified discrete cosine transform.

4. The information encoding method as claimed in claim 1, wherein the windowing function for forward orthogonal transform has a domain having a value of zero.

5. The information encoding method as claimed in claim 1, wherein the entire domain of the windowing function for forward orthogonal transform has a value of zero.

6. The information encoding method as claimed in claim 1, wherein the processing of encoding output spectral signals after the forward orthogonal transform for encoding is variable length encoding.

7. The information encoding method as claimed in claim 1, wherein the processing of encoding output spectral signals from the forward orthogonal transform processing includes extracting and separating a specified frequency component and encoding the separated frequency component.

8. The information encoding method as claimed in claim 1, wherein the information is an acoustic signal.

9. An information decoding method for decoding information, comprising the steps of:

decoding encoded spectral signals; and inverse orthogonal transforming the decoded spectral signals so that waveform elements will conflict with each other between neighboring blocks; wherein the shape of a windowing function for inverse orthogonal transform employed in the inverse orthogonal transform is different from that of a windowing function for forward orthogonal transform employed for forward orthogonal transform for producing the encoded spectral signals; and further wherein the shape of transient portions of the windowing function for forward orthogonal transform are obtained by dividing a window obtained by the equation:

$$w_1(n) = \left(\frac{\cos\left(\frac{\pi(n-M+0.5)}{M}\right)+1}{2}\right)q, 0 \leq n < 2M$$

into two and shifting, where $w_1(n)$ is the forward transform windowing function, q is a value close to 1 and M is a selected number of output spectral components.

10. The information decoding method as claimed in claim 9, wherein the maximum value of said windowing function for inverse orthogonal transform does not exceed a value equal to twice a median value of the windowing function for the inverse orthogonal transform.

11. The information decoding method as claimed in claim 9, wherein the forward orthogonal transform is modified discrete cosine transform.

12. The information decoding method as claimed in claim 9, wherein the windowing function for forward orthogonal transform has a domain having a value of zero.

13. The information decoding method as claimed in claim 9, wherein the entire domain of the windowing function for forward orthogonal transform has a value of zero.

14. The information decoding method as claimed in claim 9, wherein the encoded spectral signals are variable length encoded signals.

15. The information decoding method as claimed in claim 9, wherein part of the encoded spectral signals is obtained by extracting and separating specified frequency components and encoding the separated frequency components.

16. The information decoding method as claimed in claim 9, wherein the information is an acoustic signal.

17. An information encoding apparatus for encoding information, comprising:

means for forward orthogonal transforming an input signal using a forward orthogonal transform windowing function so that, on application of inverse orthogonal transform, waveform elements are conflicted between neighboring blocks for forming waveform signals; and means for encoding output spectral signals produced by the forward orthogonal transform; wherein the shape of the forward orthogonal transform windowing function employed in the forward orthogonal transform is different from that of an inverse orthogonal transform windowing function employed for inverse orthogonal transform; and further wherein the shape of transient portions of the windowing function for forward orthogonal transform are obtained by dividing a window obtained by the equation:

$$w_1(n) = \left(\frac{\cos\left(\frac{\pi(n-M+0.5)}{M}\right)+1}{2}\right)q, 0 \leq n < 2M$$

into two and shifting, where $w_1(n)$ is the forward orthogonal transform windowing function, q is a value close to 1 and M is a selected number of output spectral components.

18. The information encoding apparatus as claimed in claim 17, wherein the maximum value of said inverse orthogonal transform windowing function does not exceed a value equal to twice a median value of the inverse orthogonal transform windowing function.

19. The information encoding apparatus as claimed in claim 17, wherein the forward orthogonal transform is modified discrete cosine transform.

20. The information encoding apparatus as claimed in claim 17, wherein the windowing function for forward orthogonal transform has a domain having a value of zero.

21. The information encoding apparatus as claimed in claim 17, wherein the entire domain of the windowing function for forward orthogonal transform has a value of zero.

22. The information encoding apparatus as claimed in claim 17, wherein the encoded spectral signals are variable length encoded signals.

23. The information encoding apparatus as claimed in claim 17, wherein part of the encoded spectral signals is obtained by extracting and separating specified frequency components and encoding the separated frequency components.

24. The information encoding apparatus as claimed in claim 17, wherein the input signal is an acoustic signal.

25. An information decoding apparatus for decoding information, comprising:

means for decoding encoded spectral signals; and means for inverse orthogonal transforming the decoded spectral signals so that waveform elements will conflict with each other between neighboring blocks; wherein the shape of a windowing function for inverse orthogonal transform employed in the inverse orthogonal transform is different from that of the windowing function for forward orthogonal transform employed for forward orthogonal transform for producing the encoded spectral signals; and further wherein the shape of transient portions of the windowing function for forward orthogonal transform are obtained by dividing a window obtained by the equation:

$$w_1(n) = \left(\frac{\cos\left(\frac{\pi(n - M + 0.5)}{M}\right) + 1}{2}\right) q, \ 0 \le n < 2M$$

into two and shifting, where $w_1(n)$ is the forward transform windowing function, q is a value close to 1 and M is a selected number of output spectral components.

26. The information decoding apparatus as claimed in claim 25, wherein the maximum value of said windowing function for inverse orthogonal transform does not exceed a value equal to twice a median value of the windowing function for the inverse orthogonal transform.

27. The information decoding apparatus as claimed in claim 25, wherein the forward orthogonal transform is modified discrete cosine transform.

28. The information decoding apparatus as claimed in claim 25, wherein the windowing function for forward orthogonal transform has a domain having a value of zero.

29. The information decoding apparatus as claimed in claim 25, wherein the entire domain of the windowing function for forward orthogonal transform has a value of zero.

30. The information decoding apparatus as claimed in claim 25, wherein the encoded spectral signals are variable length encoded signals.

31. The information decoding apparatus as claimed in claim 25, wherein part of the encoded spectral signals is obtained by extracting and separating specified frequency components and encoding the separated frequency components.

32. The information decoding apparatus as claimed in claim 25, wherein the information is an acoustic signal.

33. An information transmission method, comprising the steps of:
forward orthogonal transforming an input signal for forming spectral signals;
encoding said spectral signals;
decoding the encoded spectral signals; and
inverse orthogonal transforming said decoded spectral signals using a windowing function for inverse orthogonal transform different from the windowing function for forward orthogonal transform so that waveform elements will conflict with each other between neighboring blocks;
wherein the shape of transient portions of the windowing function for forward orthogonal transform are obtained by dividing a window obtained by the equation:

$$w_1(n) = \left(\frac{\cos\left(\frac{\pi(n - M + 0.5)}{M}\right) + 1}{2}\right) q, \ 0 \le n < 2M$$

into two and shifting, where $w_1(n)$ is the forward transform windowing function, q is a value close to 1 and M is a selected number of output spectral components.

34. The information transmission method as claimed in claim 33, wherein the maximum value of said windowing function for inverse orthogonal transform does not exceed a value equal to twice a median value of the inverse orthogonal transform windowing function.

35. The information transmission method as claimed in claim 33, wherein the forward orthogonal transform is modified discrete cosine transform.

36. The information transmission method as claimed in claim 33, wherein the windowing function for forward orthogonal transform has a domain having a value of zero.

37. The information transmission method as claimed in claim 33, wherein the entire domain of the windowing function for forward orthogonal transform has a value of zero.

38. The information transmission method as claimed in claim 33, wherein the encoded spectral signals are variable length encoded signals.

39. The information transmission method as claimed in claim 20, wherein part of the encoded spectral signals is obtained by extracting and separating specified frequency components and encoding the separated frequency components.

40. The information transmission method as claimed in claim 33, wherein the input signal is an acoustic signal.

41. An information encoding method for encoding information, comprising the steps of:
forward orthogonal transforming an input signal using a windowing function for forward orthogonal transform so that, on inverse orthogonal transform, waveform elements are conflicted between neighboring blocks for forming waveform signals; and
encoding output spectral signals produced by the forward orthogonal transform;
wherein the windowing function for forward orthogonal transform employed in the forward orthogonal transform is non-symmetrical;
the shape of the windowing function for forward orthogonal transform employed in the forward orthogonal transform is different from that of a windowing function for inverse orthogonal transform employed for inverse orthogonal transform; and further
wherein the shape of transient portions of the windowing function for forward orthogonal transform are obtained by dividing a window obtained by the equation:

$$w_1(n) = \left(\frac{\cos\left(\frac{\pi(n - M + 0.5)}{M}\right) + 1}{2}\right) q, \ 0 \le n < 2M$$

into two and shifting, where $w_1(n)$ is the windowing function for forward orthogonal transform, q is a value close to 1 and M is a selected number of output spectral components.

42. The method of claim 41 wherein the maximum value of said windowing function for inverse orthogonal transform does not exceed a value equal to twice a median value of the windowing function for inverse orthogonal transform.

43. The method of claim 42 wherein the forward orthogonal transform is modified discrete cosine transform.

44. The method of claim 43 wherein the windowing function for forward orthogonal transform has a domain having a value of zero.

45. The method of claim 44 wherein the entire domain of the windowing function for forward orthogonal transform has a value of zero.

46. The method of claim 45 wherein the processing of encoding output spectral signals after the forward orthogonal transform for encoding is variable length encoding.

47. The method of claim 46 wherein the processing of encoding output spectral signals from the forward orthogonal transform processing includes extracting and separating a specified frequency component and encoding the separated frequency component.

48. The method of claim 47 wherein the information is an acoustic signal.

49. The method of claim 41 wherein the forward orthogonal transform is modified discrete cosine transform.

50. The method of claim 49 wherein the windowing function for forward orthogonal transform has a domain having a value of zero.

51. The method of claim 50 wherein the entire domain of the windowing function for forward orthogonal transform has a value of zero.

52. The method of claim 51 wherein the processing of encoding output spectral signals after the forward orthogonal transform for encoding is variable length encoding.

53. The method of claim 52 wherein the processing of encoding output spectral signals from the forward orthogonal transform processing includes extracting and separating a specified frequency component and encoding the separated frequency component.

54. The method of claim 53 wherein the information is an acoustic signal.

55. The method of claim 41 wherein the windowing function for forward orthogonal transform has a domain having a value of zero.

56. The method of claim 55 wherein the entire domain of the windowing function for forward orthogonal transform has a value of zero.

57. The method of claim 56 wherein the processing of encoding output spectral signals after the forward orthogonal transform for encoding is variable length encoding.

58. The method of claim 57 wherein the processing of encoding output spectral signals from the forward orthogonal transform processing includes extracting and separating a specified frequency component and encoding the separated frequency component.

59. The method of claim 58 wherein the information is an acoustic signal.

60. The method of claim 41 wherein the entire domain of the windowing function for forward orthogonal transform has a value of zero.

61. The method of claim 60 wherein the processing of encoding output spectral signals after the forward orthogonal transform for encoding is variable length encoding.

62. The method of claim 61 wherein the processing of encoding output spectral signals from the forward orthogonal transform processing includes extracting and separating a specified frequency component and encoding the separated frequency component.

63. The method of claim 62 wherein the information is an acoustic signal.

64. The method of claim 41 wherein the processing of encoding output spectral signals after the forward orthogonal transform for encoding is variable length encoding.

65. The method of claim 64 wherein the processing of encoding output spectral signals from the forward orthogonal transform processing includes extracting and separating a specified frequency component and encoding the separated frequency component.

66. The method of claim 65 wherein the information is an acoustic signal.

67. The method of claim 41 wherein the processing of encoding output spectral signals from the forward orthogonal transform processing includes extracting and separating a specified frequency component and encoding the separated frequency component.

68. The method of claim 67 wherein the information is an acoustic signal.

69. The method of claim 41 wherein the information is an acoustic signal.

70. An information encoding method for encoding information, comprising the steps of:

forward orthogonal transforming an input signal using a windowing function for forward orthogonal transform so that, on inverse orthogonal transform, waveform elements are conflicted between neighboring blocks for forming waveform signals; and encoding output spectral signals produced by the forward orthogonal transform;

wherein the windowing function for forward orthogonal transform employed in the forward orthogonal transform is non-symmetrical;

wherein the shape of the windowing function for forward orthogonal transform employed in the forward orthogonal transform is different from that of a windowing function for inverse orthogonal transform employed for inverse orthogonal transform; and further wherein the shape of a transient portion of the windowing function for inverse orthogonal transform is obtained by the equation:

$$w_2(n) = \frac{w_1(n)}{\sqrt{w_1^2(n) + w_1^2(M-1-n)}}, 0 \le n < M$$

where $w_1(n)$ is the transient portion of the windowing function for forward orthogonal transform and $w_2(n)$ is the transient portion of the windowing function for inverse orthogonal transform, and M is the number of components of $w_1$.

71. The method of claim 70 wherein the maximum value of said windowing function for inverse orthogonal transform does not exceed a value equal to twice a median value of the windowing function for inverse orthogonal transform.

72. The method of claim 71 wherein the forward orthogonal transform is modified discrete cosine transform.

73. The method of claim 72 wherein the windowing function for forward orthogonal transform has a domain having a value of zero.

74. The method of claim 73 wherein the entire domain of the windowing function for forward orthogonal transform has a value of zero.

75. The method of claim 74 wherein the processing of encoding output spectral signals after the forward orthogonal transform for encoding is variable length encoding.

76. The method of claim 75 wherein the processing of encoding output spectral signals from the forward orthogonal transform processing includes extracting and separating a specified frequency component and encoding the separated frequency component.

77. The method of claim 76 wherein the information is an acoustic signal.

78. The method of claim 70 wherein the forward orthogonal transform is modified discrete cosine transform.

79. The method of claim 78 wherein the windowing function for forward orthogonal transform has a domain having a value of zero.

80. The method of claim 79 wherein the entire domain of the windowing function for forward orthogonal transform has a value of zero.

81. The method of claim 80 wherein the processing of encoding output spectral signals after the forward orthogonal transform for encoding is variable length encoding.

82. The method of claim 81 wherein the processing of encoding output spectral signals from the forward orthogonal transform processing includes extracting and separating a specified frequency component and encoding the separated frequency component.

83. The method of claim 82 wherein the information is an acoustic signal.

84. The method of claim 70 wherein the windowing function for forward orthogonal transform has a domain having a value of zero.

85. The method of claim 84 wherein the entire domain of the windowing function for forward orthogonal transform has a value of zero.

86. The method of claim 85 wherein the processing of encoding output spectral signals after the forward orthogonal transform for encoding is variable length encoding.

87. The method of claim 86 wherein the processing of encoding output spectral signals from the forward orthogonal transform processing includes extracting and separating a specified frequency component and encoding the separated frequency component.

88. The method of claim 87 wherein the information is an acoustic signal.

89. The method of claim 70 wherein the entire domain of the windowing function for forward orthogonal transform has a value of zero.

90. The method of claim 89 wherein the processing of encoding output spectral signals after the forward orthogonal transform for encoding is variable length encoding.

91. The method of claim 90 wherein the processing of encoding output spectral signals from the forward orthogonal transform processing includes extracting and separating a specified frequency component and encoding the separated frequency component.

92. The method of claim 91 wherein the information is an acoustic signal.

93. The method of claim 70 wherein the processing of encoding output spectral signals after the forward orthogonal transform for encoding is variable length encoding.

94. The method of claim 93 wherein the processing of encoding output spectral signals from the forward orthogonal transform processing includes extracting and separating a specified frequency component and encoding the separated frequency component.

95. The method of claim 94 wherein the information is an acoustic signal.

96. The method of claim 70 wherein the processing of encoding output spectral signals from the forward orthogonal transform processing includes extracting and separating a specified frequency component and encoding the separated frequency component.

97. The method of claim 96 wherein the information is an acoustic signal.

98. The method of claim 70 wherein the information is an acoustic signal.

99. An information decoding method for decoding information, comprising the steps of:

decoding encoded spectral signals; and inverse orthogonal transforming the decoded spectral signals so that waveform elements will conflict with each other between neighboring blocks;

wherein the shape of a windowing function for inverse orthogonal transform employed in the inverse orthogonal transform is different from that of a windowing function for forward orthogonal transform employed for forward orthogonal transform for producing the encoded spectral signals;

wherein the windowing function for forward orthogonal transform employed in the forward orthogonal transform is non-symmetrical; and further wherein the shape of transient portions of the windowing function for forward orthogonal transform are obtained by dividing a window obtained by the equation:

$$w_1(n) = \left(\frac{\cos\left(\frac{\pi(n-M+0.5)}{M}\right)+1}{2}\right)q, \ 0 \leq n < 2M$$

into two and shifting, where $w_1(n)$ is the forward transform windowing function, q is a value close to 1 and M is a selected number of output spectral components.

100. The method of claim 99 wherein the maximum value of said windowing function for inverse orthogonal transform does not exceed a value equal to twice a median value of the windowing function for the inverse orthogonal transform.

101. The method of claim 100 wherein the forward orthogonal transform is modified discrete cosine transform.

102. The method of claim 101 wherein the windowing function for forward orthogonal transform has a domain having a value of zero.

103. The method of claim 102 wherein the entire domain of the windowing function for forward orthogonal transform has a value of zero.

104. The method of claim 103 wherein the encoded spectral signals are variable length encoded signals.

105. The method of claim 104 wherein part of the encoded spectral signals is obtained extracting and separating specified frequency components and encoding the separated frequency components.

106. The method of claim 105 wherein the information is an acoustic signal.

107. The method of claim 99 wherein the forward orthogonal transform is modified discrete cosine transform.

108. The method of claim 107 wherein the windowing function for forward orthogonal transform has a domain having a value of zero.

109. The method of claim 108 wherein the entire domain of the windowing function for forward orthogonal transform has a value of zero.

110. The method of claim 109 wherein the encoded spectral signals are variable length encoded signals.

111. The method of claim 110 wherein part of the encoded spectral signals is obtained extracting and separating specified frequency components and encoding the separated frequency components.

112. The method of claim 111 wherein the information is an acoustic signal.

113. The method of claim 112 wherein the windowing function for forward orthogonal transform has a domain having a value of zero.

114. The method of claim 113 wherein the entire domain of the windowing function for forward orthogonal transform has a value of zero.

115. The method of claim 114 wherein the encoded spectral signals are variable length encoded signals.

116. The method of claim 115 wherein part of the encoded spectral signals is obtained extracting and separating specified frequency components and encoding the separated frequency components.

117. The method of claim 116 wherein the information is an acoustic signal.

118. The method of claim 117 wherein the entire domain of the windowing function for forward orthogonal transform has a value of zero.

119. The method of claim 118 wherein the encoded spectral signals are variable length encoded signals.

120. The method of claim 119 wherein part of the encoded spectral signals is obtained extracting and separating specified frequency components and encoding the separated frequency components.

121. The method of claim 120 wherein the information is an acoustic signal.

122. The method of claim 121 wherein the encoded spectral signals are variable length encoded signals.

123. The method of claim 122 wherein part of the encoded spectral signals is obtained extracting and separating specified frequency components and encoding the separated frequency components.

124. The method of claim 123 wherein the information is an acoustic signal.

125. The method of claim 124 wherein part of the encoded spectral signals is obtained extracting and separating specified frequency components and encoding the separated frequency components.

126. The method of claim 125 wherein the information is an acoustic signal.

127. The method of claim 99 wherein the information is an acoustic signal.

128. An information decoding method for decoding information, comprising the steps of:

decoding encoded spectral signals; and inverse orthogonal transforming the decoded spectral signals so that waveform elements will conflict with each other between neighboring blocks;

wherein the shape of a windowing function for inverse orthogonal transform employed in the inverse orthogonal transform is different from that of a windowing function for forward orthogonal transform employed for forward orthogonal transform for producing the encoded spectral signals;

wherein the windowing function for forward orthogonal transform employed in the forward orthogonal transform is non-symmetrical; and further wherein the shape of a transient portion of the windowing function for inverse orthogonal transform is obtained by the equation:

$$w_2(n) = \frac{w_1(n)}{w_1^2(n) + w_1^2(M-1-n)}, 0 \le n < M$$

where $w_1(n)$ is the transient portion of the windowing function for forward orthogonal transform and $w_2(n)$ is the transient portion of the windowing function for inverse orthogonal transform, and M is the number of components of $w_1$.

129. The method of claim 128 wherein the maximum value of said windowing function for inverse orthogonal transform does not exceed a value equal to twice a median value of the windowing function for the inverse orthogonal transform.

130. The method of claim 129 wherein the forward orthogonal transform is modified discrete cosine transform.

131. The method of claim 130 wherein the windowing function for forward orthogonal transform has a domain having a value of zero.

132. The method of claim 131 wherein the entire domain of the windowing function for forward orthogonal transform has a value of zero.

133. The method of claim 132 wherein the encoded spectral signals are variable length encoded signals.

134. The method of claim 133 wherein part of the encoded spectral signals is obtained extracting and separating specified frequency components and encoding the separated frequency components.

135. The method of claim 134 wherein the information is an acoustic signal.

136. The method of claim 128 wherein the forward orthogonal transform is modified discrete cosine transform.

137. The method of claim 136 wherein the windowing function for forward orthogonal transform has a domain having a value of zero.

138. The method of claim 137 wherein the entire domain of the windowing function for forward orthogonal transform has a value of zero.

139. The method of claim 138 wherein the encoded spectral signals are variable length encoded signals.

140. The method of claim 139 wherein part of the encoded spectral signals is obtained extracting and separating specified frequency components and encoding the separated frequency components.

141. The method of claim 140 wherein the information is an acoustic signal.

142. The method of claim 128 wherein the windowing function for forward orthogonal transform has a domain having a value of zero.

143. The method of claim 142 wherein the entire domain of the windowing function for forward orthogonal transform has a value of zero.

144. The method of claim 143 wherein the encoded spectral signals are variable length encoded signals.

145. The method of claim 144 wherein part of the encoded spectral signals is obtained extracting and separating specified frequency components and encoding the separated frequency components.

146. The method of claim 145 wherein the information is an acoustic signal.

147. The method of claim 128 wherein the entire domain of the windowing function for forward orthogonal transform has a value of zero.

148. The method of claim 147 wherein the encoded spectral signals are variable length encoded signals.

149. The method of claim 148 wherein part of the encoded spectral signals is obtained extracting and separating specified frequency components and encoding the separated frequency components.

150. The method of claim 149 wherein the information is an acoustic signal.

151. The method of claim 128 wherein the encoded spectral signals are variable length encoded signals.

152. The method of claim 151 wherein part of the encoded spectral signals is obtained extracting and separating specified frequency components and encoding the separated frequency components.

153. The method of claim 152 wherein the information is an acoustic signal.

154. The method of claim 128 wherein part of the encoded spectral signals is obtained extracting and separating specified frequency components and encoding the separated frequency components.

155. The method of claim 154 wherein the information is an acoustic signal.

156. The method of claim 128 wherein the information is an acoustic signal.

157. An information encoding apparatus for encoding information, comprising:

means for forward orthogonal transforming an input signal using a forward orthogonal transform windowing function so that, on application of inverse orthogonal transform, waveform elements are conflicted between neighboring blocks for forming waveform signals; and means for encoding output spectral signals produced by the forward orthogonal transform;

wherein the windowing function for forward orthogonal transform employed in the forward orthogonal transform is non-symmetrical;

the shape of the forward orthogonal transform windowing function employed in the forward orthogonal transform is different from that of an inverse orthogonal transform windowing function employed for inverse orthogonal transform; and further wherein the shape of transient portions of the windowing function for forward orthogonal transform are obtained by dividing a window obtained by the equation:

$$w_1(n) = \left(\frac{\cos\left(\frac{\pi(n - M + 0.5)}{M}\right) + 1}{2}\right) q, \ 0 \le n < 2M$$

into two and shifting, where $w_1(n)$ is the forward orthogonal transform windowing function, q is a value close to 1 and M is a selected number of output spectral components.

158. The apparatus of claim 157 wherein the maximum value of said inverse orthogonal transform windowing function does not exceed a value equal to twice a median value of the inverse orthogonal transform windowing function.

159. The apparatus of claim 158 wherein the forward orthogonal transform is modified discrete cosine transform.

160. The apparatus of claim 159 wherein the windowing function for forward orthogonal transform has a domain having a value of zero.

161. The apparatus of claim 160 wherein the entire domain of the windowing function for forward orthogonal transform has a value of zero.

162. The apparatus of claim 161 wherein the encoded spectral signals are variable length encoded signals.

163. The apparatus of claim 162 wherein part of the encoded spectral signals is obtained by extracting and separating specified frequency components and encoding the separated frequency components.

164. The apparatus of claim 163 wherein the input signal is an acoustic signal.

165. The apparatus of claim 157 wherein the forward orthogonal transform is modified discrete cosine transform.

166. The apparatus of claim 165 wherein the windowing function for forward orthogonal transform has a domain having a value of zero.

167. The apparatus of claim 166 wherein the entire domain of the windowing function for forward orthogonal transform has a value of zero.

168. The apparatus of claim 167 wherein the encoded spectral signals are variable length encoded signals.

169. The apparatus of claim 168 wherein part of the encoded spectral signals is obtained by extracting and separating specified frequency components and encoding the separated frequency components.

170. The apparatus of claim 169 wherein the input signal is an acoustic signal.

171. The apparatus of claim 157 wherein the windowing function for forward orthogonal transform has a domain having a value of zero.

172. The apparatus of claim 171 wherein the entire domain of the windowing function for forward orthogonal transform has a value of zero.

173. The apparatus of claim 172 wherein the encoded spectral signals are variable length encoded signals.

174. The apparatus of claim 173 wherein part of the encoded spectral signals is obtained by extracting and separating specified frequency components and encoding the separated frequency components.

175. The apparatus of claim 174 wherein the input signal is an acoustic signal.

176. The apparatus of claim 157 wherein the entire domain of the windowing function for forward orthogonal transform has a value of zero.

177. The apparatus of claim 176 wherein the encoded spectral signals are variable length encoded signals.

178. The apparatus of claim 177 wherein part of the encoded spectral signals is obtained by extracting and separating specified frequency components and encoding the separated frequency components.

179. The apparatus of claim 178 wherein the input signal is an acoustic signal.

180. The apparatus of claim 157 wherein the encoded spectral signals are variable length encoded signals.

181. The apparatus of claim 180 wherein part of the encoded spectral signals is obtained by extracting and separating specified frequency components and encoding the separated frequency components.

182. The apparatus of claim 181 wherein the input signal is an acoustic signal.

183. The apparatus of claim 157 wherein part of the encoded spectral signals is obtained by extracting and separating specified frequency components and encoding the separated frequency components.

184. The apparatus of claim 183 wherein the input signal is an acoustic signal.

185. The apparatus of claim 157 wherein the input signal is an acoustic signal.

186. An information encoding apparatus for encoding information, comprising:

means for forward orthogonal transforming an input signal using a forward orthogonal transform windowing function so that, on application of inverse orthogonal transform, waveform elements are conflicted between neighboring blocks for forming waveform signals; and means for encoding output spectral signals produced by the forward orthogonal transform;

wherein the windowing function for forward orthogonal transform employed in the forward orthogonal transform is non-symmetrical;

wherein the shape of the forward orthogonal transform windowing function employed in the forward orthogonal transform is different from that of an inverse orthogonal transform windowing function employed for inverse orthogonal transform; and further wherein the shape of a transient portion of the windowing function for inverse orthogonal transform is obtained by the equation:

$$w_2(n) = \frac{w_1(n)}{w_1^2(n) + w_1^2(M - 1 - n)}, \ 0 \le n < M$$

where $w_1(n)$ is the transient portion of the windowing function for forward orthogonal transform and $w_2(n)$ is the transient portion of the windowing function for inverse orthogonal transform, and M is the number of components of $w_1$.

187. The apparatus of claim 186 wherein the maximum value of said inverse orthogonal transform windowing function does not exceed a value equal to twice a median value of the inverse orthogonal transform windowing function.

188. The apparatus of claim 187 wherein the forward orthogonal transform is modified discrete cosine transform.

189. The apparatus of claim 188 wherein the windowing function for forward orthogonal transform has a domain having a value of zero.

190. The apparatus of claim 189 wherein the entire domain of the windowing function for forward orthogonal transform has a value of zero.

191. The apparatus of claim 190 wherein the encoded spectral signals are variable length encoded signals.

192. The apparatus of claim 191 wherein part of the encoded spectral signals is obtained by extracting and separating specified frequency components and encoding the separated frequency components.

193. The apparatus of claim 192 wherein the input signal is an acoustic signal.

194. The apparatus of claim 186 wherein the forward orthogonal transform is modified discrete cosine transform.

195. The apparatus of claim 194 wherein the windowing function for forward orthogonal transform has a domain having a value of zero.

196. The apparatus of claim 195 wherein the entire domain of the windowing function for forward orthogonal transform has a value of zero.

197. The apparatus of claim 196 wherein the encoded spectral signals are variable length encoded signals.

198. The apparatus of claim 197 wherein part of the encoded spectral signals is obtained by extracting and separating specified frequency components and encoding the separated frequency components.

199. The apparatus of claim 198 wherein the input signal is an acoustic signal.

200. The apparatus of claim 186 wherein the windowing function for forward orthogonal transform has a domain having a value of zero.

201. The apparatus of claim 200 wherein the entire domain of the windowing function for forward orthogonal transform has a value of zero.

202. The apparatus of claim 201 wherein the encoded spectral signals are variable length encoded signals.

203. The apparatus of claim 202 wherein part of the encoded spectral signals is obtained by extracting and separating specified frequency components and encoding the separated frequency components.

204. The apparatus of claim 203 wherein the input signal is an acoustic signal.

205. The apparatus of claim 186 wherein the entire domain of the windowing function for forward orthogonal transform has a value of zero.

206. The apparatus of claim 205 wherein the encoded spectral signals are variable length encoded signals.

207. The apparatus of claim 206 wherein part of the encoded spectral signals is obtained by extracting and separating specified frequency components and encoding the separated frequency components.

208. The apparatus of claim 207 wherein the input signal is an acoustic signal.

209. The apparatus of claim 186 wherein the encoded spectral signals are variable length encoded signals.

210. The apparatus of claim 209 wherein part of the encoded spectral signals is obtained by extracting and separating specified frequency components and encoding the separated frequency components.

211. The apparatus of claim 210 wherein the input signal is an acoustic signal.

212. The apparatus of claim 186 wherein part of the encoded spectral signals is obtained by extracting and separating specified frequency components and encoding the separated frequency components.

213. The apparatus of claim 212 wherein the input signal is an acoustic signal.

214. The apparatus of claim 186 wherein the input signal is an acoustic signal.

215. An information decoding apparatus for decoding information, comprising:

means for decoding encoded spectral signals; and
means for inverse orthogonal transforming the decoded spectral signals so that waveform elements will conflict with each other between neighboring blocks;
wherein the shape of a windowing function for inverse orthogonal transform employed in the inverse orthogonal transform is different from that of the windowing function for forward orthogonal transform employed for forward orthogonal transform for producing the encoded spectral signals;
the windowing function for forward orthogonal transform employed in the forward orthogonal transform is non-symmetrical; and further
wherein the shape of transient portions of the windowing function for forward orthogonal transform are obtained by dividing a window obtained by the equation:

$$w_1(n) = \left( \frac{\cos\left(\frac{\pi(n - M + 0.5)}{M}\right) + 1}{2} \right) q, \ 0 \leq n < 2M$$

into two and shifting, where $w_1(n)$ is the forward transform windowing function, q is a value close to 1 and M is a selected number of output spectral components.

216. The apparatus of claim 215 wherein the maximum value of said windowing function for inverse orthogonal transform does not exceed a value equal to twice a median value of the windowing function for the inverse orthogonal transform.

217. The apparatus of claim 216 wherein the forward orthogonal transform is modified discrete cosine transform.

218. The apparatus of claim 217 wherein the windowing function for forward orthogonal transform has a domain having a value of zero.

219. The apparatus of claim 218 wherein the entire domain of the windowing function for forward orthogonal transform has a value of zero.

220. The apparatus of claim 219 wherein the encoded spectral signals are variable length encoded signals.

221. The apparatus of claim 220 wherein part of the encoded spectral signals is obtained by extracting and separating specified frequency components and encoding the separated frequency components.

222. The apparatus of claim 221 wherein the information is an acoustic signal.

223. The apparatus of claim 215 wherein the forward orthogonal transform is modified discrete cosine transform.

224. The apparatus of claim 223 wherein the windowing function for forward orthogonal transform has a domain having a value of zero.

225. The apparatus of claim 224 wherein the entire domain of the windowing function for forward orthogonal transform has a value of zero.

226. The apparatus of claim 225 wherein the encoded spectral signals are variable length encoded signals.

227. The apparatus of claim 226 wherein part of the encoded spectral signals is obtained by extracting and separating specified frequency components and encoding the separated frequency components.

228. The apparatus of claim 227 wherein the information is an acoustic signal.

229. The apparatus of claim 215 wherein the windowing function for forward orthogonal transform has a domain having a value of zero.

230. The apparatus of claim 229 wherein the entire domain of the windowing function for forward orthogonal transform has a value of zero.

231. The apparatus of claim 230 wherein the encoded spectral signals are variable length encoded signals.

232. The apparatus of claim 231 wherein part of the encoded spectral signals is obtained by extracting and separating specified frequency components and encoding the separated frequency components.

233. The apparatus of claim 232 wherein the information is an acoustic signal.

234. The apparatus of claim 215 wherein the entire domain of the windowing function for forward orthogonal transform has a value of zero.

235. The apparatus of claim 234 wherein the encoded spectral signals are variable length encoded signals.

236. The apparatus of claim 235 wherein part of the encoded spectral signals is obtained by extracting and separating specified frequency components and encoding the separated frequency components.

237. The apparatus of claim 236 wherein the information is an acoustic signal.

238. The apparatus of claim 215 wherein the encoded spectral signals are variable length encoded signals.

239. The apparatus of claim 238 wherein part of the encoded spectral signals is obtained by extracting and separating specified frequency components and encoding the separated frequency components.

240. The apparatus of claim 239 wherein the information is an acoustic signal.

241. The apparatus of claim 215 wherein part of the encoded spectral signals is obtained by extracting and separating specified frequency components and encoding the separated frequency components.

242. The apparatus of claim 241 wherein the information is an acoustic signal.

243. The apparatus of claim 215 wherein the information is an acoustic signal.

244. An information decoding apparatus for decoding information, comprising:
  means for decoding encoded spectral signals; and
  means for inverse orthogonal transforming the decoded spectral signals so that waveform elements will conflict with each other between neighboring blocks;
    wherein the shape of a windowing function for inverse orthogonal transform employed in the inverse orthogonal transform is different from that of the windowing function for forward orthogonal transform employed for forward orthogonal transform for producing the encoded spectral signals;
    wherein the windowing function for forward orthogonal transform employed in the forward orthogonal transform is non-symmetrical; and further
    wherein the shape of a transient portion of the windowing function for inverse orthogonal transform is obtained by the equation:

$$w_2(n) = \frac{w_1(n)}{w_1^2(n) + w_1^2(M-1-n)}, 0 \le n < M$$

where $w_1(n)$ is the transient portion of the windowing function for forward orthogonal transform and $w_2(n)$ is the transient portion of the windowing function for inverse orthogonal transform, and M is the number of components of $w_1$.

245. The apparatus of claim 244 wherein the maximum value of said windowing function for inverse orthogonal transform does not exceed a value equal to twice a median value of the windowing function for the inverse orthogonal transform.

246. The apparatus of claim 245 wherein the forward orthogonal transform is modified discrete cosine transform.

247. The apparatus of claim 246 wherein the windowing function for forward orthogonal transform has a domain having a value of zero.

248. The apparatus of claim 247 wherein the entire domain of the windowing function for forward orthogonal transform has a value of zero.

249. The apparatus of claim 248 wherein the encoded spectral signals are variable length encoded signals.

250. The apparatus of claim 249 wherein part of the encoded spectral signals is obtained by extracting and separating specified frequency components and encoding the separated frequency components.

251. The apparatus of claim 250 wherein the information is an acoustic signal.

252. The apparatus of claim 244 wherein the forward orthogonal transform is modified discrete cosine transform.

253. The apparatus of claim 252 wherein the windowing function for forward orthogonal transform has a domain having a value of zero.

254. The apparatus of claim 253 wherein the entire domain of the windowing function for forward orthogonal transform has a value of zero.

255. The apparatus of claim 254 wherein the encoded spectral signals are variable length encoded signals.

256. The apparatus of claim 255 wherein part of the encoded spectral signals is obtained by extracting and separating specified frequency components and encoding the separated frequency components.

257. The apparatus of claim 256 wherein the information is an acoustic signal.

258. The apparatus of claim 244 wherein the windowing function for forward orthogonal transform has a domain having a value of zero.

259. The apparatus of claim 258 wherein the entire domain of the windowing function for forward orthogonal transform has a value of zero.

260. The apparatus of claim 259 wherein the encoded spectral signals are variable length encoded signals.

261. The apparatus of claim 260 wherein part of the encoded spectral signals is obtained by extracting and separating specified frequency components and encoding the separated frequency components.

262. The apparatus of claim 261 wherein the information is an acoustic signal.

263. The apparatus of claim 244 wherein the entire domain of the windowing function for forward orthogonal transform has a value of zero.

264. The apparatus of claim 263 wherein the encoded spectral signals are variable length encoded signals.

265. The apparatus of claim 264 wherein part of the encoded spectral signals is obtained by extracting and separating specified frequency components and encoding the separated frequency components.

266. The apparatus of claim 265 wherein the information is an acoustic signal.

267. The apparatus of claim 244 wherein the encoded spectral signals are variable length encoded signals.

268. The apparatus of claim 267 wherein part of the encoded spectral signals is obtained by extracting and separating specified frequency components and encoding the separated frequency components.

269. The apparatus of claim 268 wherein the information is an acoustic signal.

270. The apparatus of claim 244 wherein part of the encoded spectral signals is obtained by extracting and separating specified frequency components and encoding the separated frequency components.

271. The apparatus of claim 270 wherein the information is an acoustic signal.

272. The apparatus of claim 244 wherein the information is an acoustic signal.

273. An information transmission method, comprising the steps of:
   forward orthogonal transforming an input signal using a non-symmetrical windowing function for forward orthogonal transform for forming spectral signals;
   encoding said spectral signals;
   decoding the encoded spectral signals; and
   inverse orthogonal transforming said decoded spectral signals using a windowing function for inverse orthogonal transform different from the windowing function for forward orthogonal transform so that waveform elements will conflict with each other between neighboring blocks;
   wherein the shape of transient portions of the windowing function for forward orthogonal transform are obtained by dividing a window obtained by the equation:

$$w_1(n) = \left( \frac{\cos\left(\frac{\pi(n - M + 0.5)}{M}\right) + 1}{2} \right) q, \ 0 \le n < 2M$$

into two and shifting, where $w_1(n)$ is the forward transform windowing function, q is a value close to 1 and M is a selected number of output spectral components.

274. The method of claim 273 wherein the maximum value of said windowing function for inverse orthogonal transform does not exceed a value equal to twice a median value of the inverse orthogonal transform windowing function.

275. The method of claim 274 wherein the forward orthogonal transform is modified discrete cosine transform.

276. The method of claim 275 wherein the windowing function for forward orthogonal transform has a domain having a value of zero.

277. The method of claim 276 wherein the entire domain of the windowing function for forward orthogonal transform has a value of zero.

278. The method of claim 277 wherein the encoded spectral signals are variable length encoded signals.

279. The method of claim 278 wherein part of the encoded spectral signals is obtained by extracting and separating specified frequency components and encoding the separated frequency components.

280. The method of claim 279 wherein the input signal is an acoustic signal.

281. The method of claim 273 wherein the forward orthogonal transform is modified discrete cosine transform.

282. The method of claim 281 wherein the windowing function for forward orthogonal transform has a domain having a value of zero.

283. The method of claim 282 wherein the entire domain of the windowing function for forward orthogonal transform has a value of zero.

284. The method of claim 283 wherein the encoded spectral signals are variable length encoded signals.

285. The method of claim 284 wherein part of the encoded spectral signals is obtained by extracting and separating specified frequency components and encoding the separated frequency components.

286. The method of claim 285 wherein the input signal is an acoustic signal.

287. The method of claim 273 wherein the windowing function for forward orthogonal transform has a domain having a value of zero.

288. The method of claim 287 wherein the entire domain of the windowing function for forward orthogonal transform has a value of zero.

289. The method of claim 288 wherein the encoded spectral signals are variable length encoded signals.

290. The method of claim 289 wherein part of the encoded spectral signals is obtained by extracting and separating specified frequency components and encoding the separated frequency components.

291. The method of claim 290 wherein the input signal is an acoustic signal.

292. The method of claim 273 wherein the entire domain of the windowing function for forward orthogonal transform has a value of zero.

293. The method of claim 292 wherein the encoded spectral signals are variable length encoded signals.

294. The method of claim 293 wherein part of the encoded spectral signals is obtained by extracting and separating specified frequency components and encoding the separated frequency components.

295. The method of claim 294 wherein the input signal is an acoustic signal.

296. The method of claim 273 wherein the encoded spectral signals are variable length encoded signals.

297. The method of claim 296 wherein part of the encoded spectral signals is obtained by extracting and separating specified frequency components and encoding the separated frequency components.

298. The method of claim 297 wherein the input signal is an acoustic signal.

299. The method of claim 273 wherein part of the encoded spectral signals is obtained by extracting and separating specified frequency components and encoding the separated frequency components.

300. The method of claim 299 wherein the input signal is an acoustic signal.

301. The method of claim 273 wherein the input signal is an acoustic signal.

302. An information transmission method, comprising the steps of:
   forward orthogonal transforming an input signal using a non-symmetrical windowing function for forward orthogonal transform for forming spectral signals;
   encoding said spectral signals;
   decoding the encoded spectral signals; and
   inverse orthogonal transforming said decoded spectral signals using a windowing function for inverse orthogonal transform different from the windowing function for forward orthogonal transform so that waveform elements will conflict with each other between neighboring blocks;
   wherein the shape of a transient portion of the windowing function for inverse orthogonal transform is obtained by the equation:

$$w_2(n) = \frac{w_1(n)}{w_1^2(n) + w_1^2(M - 1 - n)}, \ 0 \le n < M$$

where $w_1(n)$ is the transient portion of the windowing function for forward orthogonal transform and $w_2(n)$ is the transient portion of the windowing function for inverse orthogonal transform, and M is the number of components of $w_1$.

303. The method of claim 302 wherein the maximum value of said windowing function for inverse orthogonal transform does not exceed a value equal to twice a median value of the inverse orthogonal transform windowing function.

304. The method of claim 303 wherein the forward orthogonal transform is modified discrete cosine transform.

305. The method of claim 304 wherein the windowing function for forward orthogonal transform has a domain having a value of zero.

306. The method of claim 305 wherein the entire domain of the windowing function for forward orthogonal transform has a value of zero.

307. The method of claim 306 wherein the encoded spectral signals are variable length encoded signals.

308. The method of claim 307 wherein part of the encoded spectral signals is obtained by extracting and separating specified frequency components and encoding the separated frequency components.

309. The method of claim 308 wherein the input signal is an acoustic signal.

310. The method of claim 302 wherein the forward orthogonal transform is modified discrete cosine transform.

311. The method of claim 310 wherein the windowing function for forward orthogonal transform has a domain having a value of zero.

312. The method of claim 311 wherein the entire domain of the windowing function for forward orthogonal transform has a value of zero.

313. The method of claim 312 wherein the encoded spectral signals are variable length encoded signals.

314. The method of claim 313 wherein part of the encoded spectral signals is obtained by extracting and separating specified frequency components and encoding the separated frequency components.

315. The method of claim 314 wherein the input signal is an acoustic signal.

316. The method of claim 302 wherein the windowing function for forward orthogonal transform has a domain having a value of zero.

317. The method of claim 316 wherein the entire domain of the windowing function for forward orthogonal transform has a value of zero.

318. The method of claim 317 wherein the encoded spectral signals are variable length encoded signals.

319. The method of claim 318 wherein part of the encoded spectral signals is obtained by extracting and separating specified frequency components and encoding the separated frequency components.

320. The method of claim 319 wherein the input signal is an acoustic signal.

321. The method of claim 320 wherein the entire domain of the windowing function for forward orthogonal transform has a value of zero.

322. The method of claim 321 wherein the encoded spectral signals are variable length encoded signals.

323. The method of claim 322 wherein part of the encoded spectral signals is obtained by extracting and separating specified frequency components and encoding the separated frequency components.

324. The method of claim 323 wherein the input signal is an acoustic signal.

325. The method of claim 302 wherein the encoded spectral signals are variable length encoded signals.

326. The method of claim 325 wherein part of the encoded spectral signals is obtained by extracting and separating specified frequency components and encoding the separated frequency components.

327. The method of claim 326 wherein the input signal is an acoustic signal.

328. The method of claim 302 wherein part of the encoded spectral signals is obtained by extracting and separating specified frequency components and encoding the separated frequency components.

329. The method of claim 328 wherein the input signal is an acoustic signal.

330. The method of claim 302 wherein the input signal is an acoustic signal.

331. An information encoding method for encoding information, comprising the steps of:

forward orthogonal transforming an input signal using a windowing function for forward orthogonal transform so that, on inverse orthogonal transform, waveform elements are conflicted between neighboring blocks for forming waveform signals; and encoding output spectral signals produced by the forward orthogonal transform;

wherein the shape of the windowing function for forward orthogonal transform employed in the forward orthogonal transform is different from that of a windowing function for inverse orthogonal transform employed for inverse orthogonal transform; and further wherein the shape of a transient portion of the windowing function for inverse orthogonal transform is obtained by the equation:

$$w_2(n) = \frac{w_1(n)}{w_1^2(n) + w_1^2(M-1-n)}, 0 \leq n < M$$

where $w_1(n)$ is the transient portion of the windowing function for forward orthogonal transform and $w_2(n)$ is the transient portion of the windowing function for inverse orthogonal transform, and M is the number of components of $w_1$.

332. An information decoding method for decoding information, comprising the steps of:

decoding encoded spectral signals; and inverse orthogonal transforming the decoded spectral signals so that waveform elements will conflict with each other between neighboring blocks; wherein the shape of a windowing function for inverse orthogonal transform employed in the inverse orthogonal transform is different from that of a windowing function for forward orthogonal transform employed for forward orthogonal transform for producing the encoded spectral signals; and further wherein the shape of a transient portion of the windowing function for inverse orthogonal transform is obtained by the equation:

$$w_2(n) = \frac{w_1(n)}{w_1^2(n) + w_1^2(M-1-n)}, 0 \leq n < M$$

where $w_1(n)$ is the transient portion of the windowing function for forward orthogonal transform and $w_2(n)$ is the transient portion of the windowing function for inverse orthogonal transform, and M is the number of components of $w_1$.

333. An information encoding apparatus for encoding information, comprising:

means for forward orthogonal transforming an input signal using a forward orthogonal transform windowing function so that, on application of inverse orthogonal transform, waveform elements are conflicted between neighboring blocks for forming waveform signals; and means for encoding output spectral signals produced by the forward orthogonal transform;

wherein the shape of the forward orthogonal transform windowing function employed in the forward orthogonal transform is different from that of an inverse orthogonal transform windowing function employed for inverse orthogonal transform; and further wherein the shape of a transient portion of the windowing function for inverse orthogonal transform is obtained by the equation:

$$w_2(n) = \frac{w_1(n)}{w_1^2(n) + w_1^2(M-1-n)}, 0 \leq n < M$$

where $w_1(n)$ is the transient portion of the windowing function for forward orthogonal transform and $w_2(n)$ is the transient portion of the windowing function for inverse orthogonal transform, and M is the number of components of $w_1$.

334. An information decoding apparatus for decoding information, comprising:

means for decoding encoded spectral signals; and means for inverse orthogonal transforming the decoded spectral signals so that waveform elements will conflict with each other between neighboring blocks; wherein the shape of a windowing function for inverse orthogonal transform employed in the inverse orthogonal transform is different from that of the windowing function for forward orthogonal transform employed for forward orthogonal transform for producing the encoded spectral signals; and further wherein the shape of a transient portion of the windowing function for inverse orthogonal transform is obtained by the equation:

$$w_2(n) = \frac{w_1(n)}{w_1^2(n) + w_1^2(M-1-n)}, 0 \leq n < M$$

where $w_1(n)$ is the transient portion of the windowing function for forward orthogonal transform and $w_2(n)$ is the transient portion of the windowing function for inverse orthogonal transform, and M is the number of components of $w_1$.

335. An information transmission method, comprising the steps of:

forward orthogonal transforming an input signal for forming spectral signals;

encoding said spectral signals;

decoding the encoded spectral signals; and inverse orthogonal transforming said decoded spectral signals using a windowing function for inverse orthogonal transform different from the windowing function for forward orthogonal transform so that waveform elements will conflict with each other between neighboring blocks;

wherein the shape of a transient portion of the windowing function for inverse orthogonal transform is obtained by the equation:

$$w_2(n) = \frac{w_1(n)}{w_1^2(n) + w_1^2(M-1-n)}, 0 \leq n < M$$

where $w_1(n)$ is the transient portion of the windowing function for forward orthogonal transform and $w_2(n)$ is the transient portion of the windowing function for inverse orthogonal transform, and M is the number of components of $w_1$.

* * * * *